(12) United States Patent
Saika

(10) Patent No.: US 8,700,871 B2
(45) Date of Patent: Apr. 15, 2014

(54) MIGRATING SNAPSHOT DATA ACCORDING TO CALCULATED DE-DUPLICATION EFFICIENCY

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1013 days.

(21) Appl. No.: 12/741,972

(22) PCT Filed: Apr. 22, 2010

(86) PCT No.: PCT/JP2010/002906
§ 371 (c)(1),
(2), (4) Date: May 7, 2010

(87) PCT Pub. No.: WO2011/132227
PCT Pub. Date: Oct. 27, 2011

(65) Prior Publication Data
US 2012/0011336 A1 Jan. 12, 2012

(51) Int. Cl.
*G06F 12/00* (2006.01)
*G06F 13/00* (2006.01)
*G06F 13/28* (2006.01)
*G06F 15/167* (2006.01)
*G06F 15/16* (2006.01)
*G06F 7/00* (2006.01)
*G06F 17/00* (2006.01)

(52) U.S. Cl.
USPC .......... 711/162; 711/100; 711/161; 711/165; 709/213; 709/214; 709/217; 709/218; 709/219; 707/610; 707/638; 707/639; 707/649; 707/664; 707/692; 707/694

(58) Field of Classification Search
None
See application file for complete search history.

(56) References Cited

U.S. PATENT DOCUMENTS

| 6,594,744 B1 * | 7/2003 | Humlicek et al. ............ 711/162 |
| 2005/0027819 A1 | 2/2005 | Nakano |
| 2007/0106709 A1 * | 5/2007 | Augenstein et al. .......... 707/203 |

(Continued)

FOREIGN PATENT DOCUMENTS

| JP | 2007-094472 | 4/2007 |
| JP | 2009-080671 | 4/2009 |
| JP | 2009-181206 | 8/2009 |
| JP | 2009-217404 | 9/2009 |

OTHER PUBLICATIONS

International Search Report in International Application No. PCT/JP2010/002906 mailed Jan. 17, 2011.

(Continued)

*Primary Examiner* — Yaima Rigol
*Assistant Examiner* — Marwan Ayash
(74) *Attorney, Agent, or Firm* — Brundidge & Stanger, P.C.

(57) ABSTRACT

A storage resource is effectively utilized in migration of a snapshot. First de-duplication efficiency which is de-duplication efficiency of snapshot data, and second de-duplication efficiency which is de-duplication efficiency of snapshot entities created on the basis of the snapshot data are calculated and compared with each other. Based on a result of the comparison as well as a first preservation period set for the snapshot in the migration source and a second preservation period set for the snapshot in the migration destination, one of the following methods is selected: a first method of migrating an snapshot image, a second method of migrating snapshot data to an archive storage system, and a third method of migrating data materialized from a first differential volume, a second differential volume, and a switch snapshot.

10 Claims, 39 Drawing Sheets

(56) References Cited

U.S. PATENT DOCUMENTS

| | | | |
|---|---|---|---|
| 2009/0063795 A1* | 3/2009 | Yueh | 711/162 |
| 2009/0083344 A1 | 3/2009 | Inoue et al. | |
| 2009/0172039 A1 | 7/2009 | Honami et al. | |
| 2009/0193206 A1 | 7/2009 | Ishii et al. | |
| 2009/0228532 A1 | 9/2009 | Anzai | |
| 2010/0138827 A1* | 6/2010 | Frank et al. | 718/1 |
| 2011/0231362 A1* | 9/2011 | Attarde et al. | 707/609 |

OTHER PUBLICATIONS

Written Opinion in International Application No. PCT/JP2010/002906 mailed Jan. 17, 2011.

* cited by examiner

SNAPSHOT REQUEST ACQUISITION SCREEN 850

| FILE SYSTEM NAME: FS 1 | |
|---|---|
| SEARCH CONDITION | SEARCH RESULT: /user/taro |
| VOLUME NAME<br><br>PVOL1<br><br><br><br><br><br>SEARCH | SEARCH RESULT:<br>FILE NAME    SIZE      LATEST ACQUISITION DATE<br>PVOL 1      500 GB    2010 /3/3 00:30:04<br><br>ACQUISITION RESULT:<br>FILE NAME    SIZE      PRESENT ACQUISITION DATE<br>VVOL 1       500 GB    2010 /3/4 00:30:05<br><br>SEND REQUEST |

ABBREVIATIONS: u -> user, g -> group, o -> OTHER (OTHER THAN USER)
ABBREVIATIONS: r -> read, x -> execute, w -> write

Fig. 12

DIRECTORY ENTRY 1200

1211      1212

| FILE PATH NAME | inode NUMBER |
|---|---|
| /home/user-01/···/a.txt | 100 |
| /home/user-02/···/b.txt | 200 |
| ⋮ | ⋮ |

ILLUSTRATION OF FIRST METHOD

ILLUSTRATION OF FIRST METHOD

ILLUSTRATION OF SECOND METHOD

ILLUSTRATION OF SECOND METHOD

ILLUSTRATION OF THIRD METHOD

ILLUSTRATION OF THIRD METHOD

Fig. 23A

VOLUME CONFIGURATION TABLE 922

| PVOL NAME (9221) | DVOL NAME (9222) |
|---|---|
| PVOL | DVOL1 |
|  | DVOL2 |
|  | DVOL3 |
|  | DVOL4 |
|  | DVOL5 |

Fig. 23B

SNAPSHOT CONFIGURATION TABLE 924

| SNAPSHOT NAME (9241) | PVOL NAME (9242) | DVOL NAME (9243) | TYPE (9244) |
|---|---|---|---|
| VVOL11 | PVOL | DVOL1 | NORMAL |
| VVOL12 | PVOL | DVOL1 | NORMAL |
| ⋮ | ⋮ | ⋮ | ⋮ |
| VVOL20 | PVOL | DVOL2 | SWITCH |
| VVOL21 | PVOL | DVOL2 | NORMAL |
| ⋮ | ⋮ | ⋮ | ⋮ |
| VVOL30 | PVOL | DVOL3 | SWITCH |
| VVOL31 | PVOL | DVOL3 | NORMAL |
| ⋮ | ⋮ | ⋮ | ⋮ |

MIGRATING SNAPSHOT DATA ACCORDING TO CALCULATED DE-DUPLICATION EFFICIENCY

TECHNICAL FIELD

The present invention relates to a method of controlling an information processing system and an information apparatus, and in particular, to a technique for making effective use of a storage resource in data migration involving a snapshot.

BACKGROUND ART

Patent Literature (PTL) 1 relates to a scheme with which, if a plurality of files of the same content are stored in a storage resource, the files are consolidated into a single file and then managed. According to PTL 1, one of multiple volumes storing therein duplicating files is selected as a destination volume of the consolidation on the basis of loads on the multiple volumes in order to avoid the concentration of loads on a highly loaded volume as a result of data de-duplication.

PTL 2 describes how to achieve easy migration of data and snapshot configurations from a first storage control apparatus to a second storage control apparatus. Specifically, the storage content of the oldest generation first snapshot volume is firstly restored in the second volume. Then, in order from the oldest generation to the newest generation, differential data is detected between the content of the first snapshot volume of a migration-target generation and that of the first snapshot volume that is one generation newer than the first snapshot volume of the migration-target generation. Then, the detected differential data is transferred to the second storage control apparatus and written into the second volume.

PTL 3 describes how to achieve continuous provision of snapshots to a client when migration of data is performed on a file basis between server apparatuses. When data is transferred from a migration-source server to a migration-destination server via an intermediate server, data in a differential volume is transferred simultaneously. Then, the migration-destination server reconstructs data in a snapshot volume in on the basis of the transferred data, and transfers response information on the reconstructed data to the client.

PTL 4 describes how to prevent deterioration in performance of a system due to storing of many snapshots. Snapshots are managed in such a manner that differential data is saved to a differential volume in response to writing of data into a first storage volume. A management table for snapshots is created in such a manner that the management table is divided for each snapshot on the basis of creation time of the snapshot. The second and following management tables each store therein specified inheritance information to inherit the content of the preceding management table.

CITATION LIST

Patent Literature

PTL 1: Japanese Patent Application Laid-open Publication No. 2009-80671
PTL 2: Japanese Patent Application Laid-open Publication No. 2009-181206
PTL 3: Japanese Patent Application Laid-open Publication No. 2009-217404
PTL 4: Japanese Patent Application Laid-open Publication No. 2007-94472

SUMMARY OF INVENTION

Technical Problem

Meanwhile, even when data used for management of a snapshot (hereinafter, snapshot data) is migrated from a migration-source storage system to a migration-destination storage system, an information processing system using any of the de-duplication schemes described above may not provide the effect of de-duplication in the migration destination. This is because the management method of the snapshot data may be different between the migration source and the migration destination. For example, consider a case where a certain logical volume (hereinafter, PVOL) and a logical volume that stores therein differential data (hereinafter, DVOL) are managed as snapshot data of the PVOL in the migration source. In this case, if all the snapshots are materialized in the migration destination as a result of migration performed for archiving, the effect of the de-duplication may be hindered.

The present invention is made in view of the above circumstances. An object of the present invention is to provide a method of controlling an information processing system and an information apparatus which enable effective use of a storage resource in data migration involving a snapshot.

Solution to Problem

One aspect of the present invention to achieve the above object provides a method of controlling an information processing system including a first storage system that includes a first server apparatus and a first storage apparatus that is communicatively coupled with the first server apparatus, and a second storage system that includes a second server apparatus and a second storage apparatus that is communicatively coupled with the second server apparatus, the first storage system and the second storage system being communicatively coupled with each other, wherein the first storage apparatus provides a first logical volume to the first server apparatus, the second storage apparatus provides a second logical volume to the second server apparatus, the first storage system performs de-duplication of data stored in the first logical storage by using a common entity as entities of data associated with an identifier that the first server apparatus specifies when accessing the first logical volume, the second storage system performs de-duplication of data stored in the second logical storage by using a common entity as entities of data associated with an identifier that the second server apparatus specifies when accessing the second logical volume, the first server apparatus acquires a snapshot of a primary volume that is the first logical volume, the first server apparatus stores snapshot data including the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and second de-duplication efficiency which is de-duplication efficiency of snapshot entities that are created on the basis of the snapshot data, and the first server apparatus selects a method of migrating data related to the snapshot to the second storage system on the basis of a result obtained by comparing the first de-duplication efficiency with the second de-duplication efficiency.

Other problems and solutions disclosed in the present application will be apparent by the portion describing an embodiment of the invention as well as the drawings.

Advantageous Effects of Invention

According to the present invention, a storage resource can be effectively utilized in a storage system.

BRIEF DESCRIPTION OF DRAWINGS

FIG. 12 illustrates an exemplary directory entry 1200.

FIG. 23A is a diagram illustrating an exemplary volume configuration table 922.

FIG. 23B is a diagram illustrating an exemplary snapshot configuration table 924.

DESCRIPTION OF EMBODIMENTS

Figure 1:
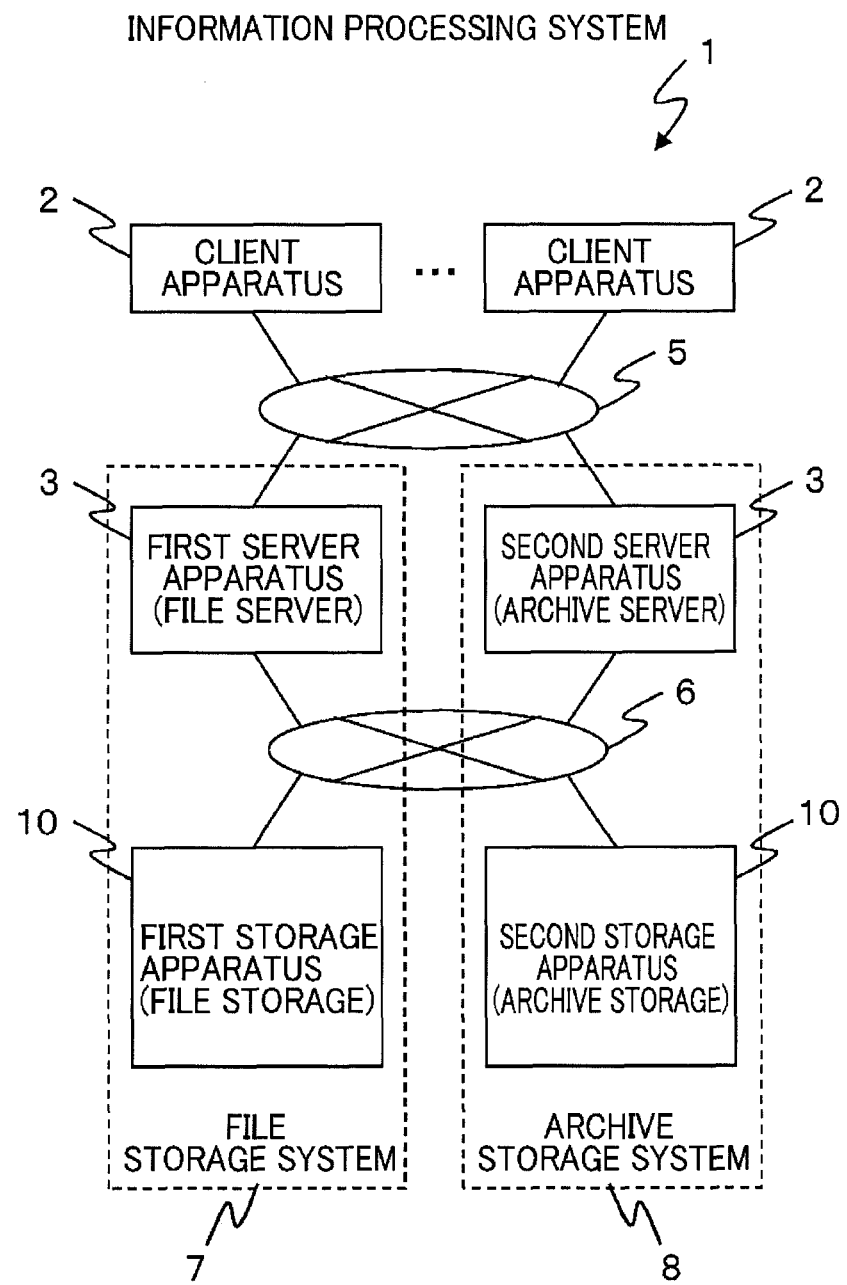
FIG. 1 is a diagram illustrating a schematic diagram of an information processing system 1.

FIG. 1 illustrates a schematic configuration of an information processing system 1 that is described as an embodiment. As illustrated in FIG. 1, the information processing system 1 includes at least one client apparatus 2, a first server apparatus 3, a second server apparatus 3, a first storage apparatus 10 accessed by the first server apparatus 3, and a second storage apparatus 10 accessed by the second server apparatus 3. In the description below, the first server apparatus 3 and the second server apparatus 3 are sometimes referred to collectively and simply as a server apparatus 3. Further, the first storage apparatus 10 and the second storage apparatus 10 are sometimes referred to collectively and simply as a storage apparatus 10.

The storage system including the first server apparatus 3 and the first storage apparatus 10 is for example a system (hereinafter, file storage system 7) that the client apparatus 2 uses as a data storage area. The storage system including the second server apparatus 3 and the second storage apparatus 10 is for example a system (hereinafter, archive storage system 8) that functions as a backup system for data managed in the file storage system 7.

As illustrated in FIG. 1, the client apparatus 2 is communicatively coupled with the server apparatus 3 via a communication network 5. Further, the server apparatus 3 is communicatively coupled with the storage apparatus 10 via a storage network 6. The communication network 5 may be a LAN (Local Area Network), WAN (Wide Area Network), Internet, public communication network, special purpose line, or the like. The storage network 6 may be a LAN (Local Area Network), WAN (Wide Area Network), SAN (Storage Area Network), Internet, public communication network, special purpose line, or the like.

The communication via the communication network 5 and the storage network 6 is implemented based for example on a protocol such as TCP/IP, iSCSI (Internet Small Computer System Interface), fibre channel protocol, FICON (Fibre Connection) (Registered Trademark), ESCON (Enterprise System Connection) (Registered Trademark), ACONARC (Advanced Connection Architecture) (Registered Trademark), FIBARC (Fibre Connection Architecture) (Registered Trademark), or the like.

The client apparatus 2 is for example a personal computer, an office computer, or the like. The client apparatus 2 is an information apparatus that utilizes the storage area provided by the storage apparatus 10 via the server apparatus 3. In the client apparatus 2, a file system, an operating system that is executed by software modules such as a kernel and a driver, and various kinds of applications are operated.

Figure 2:
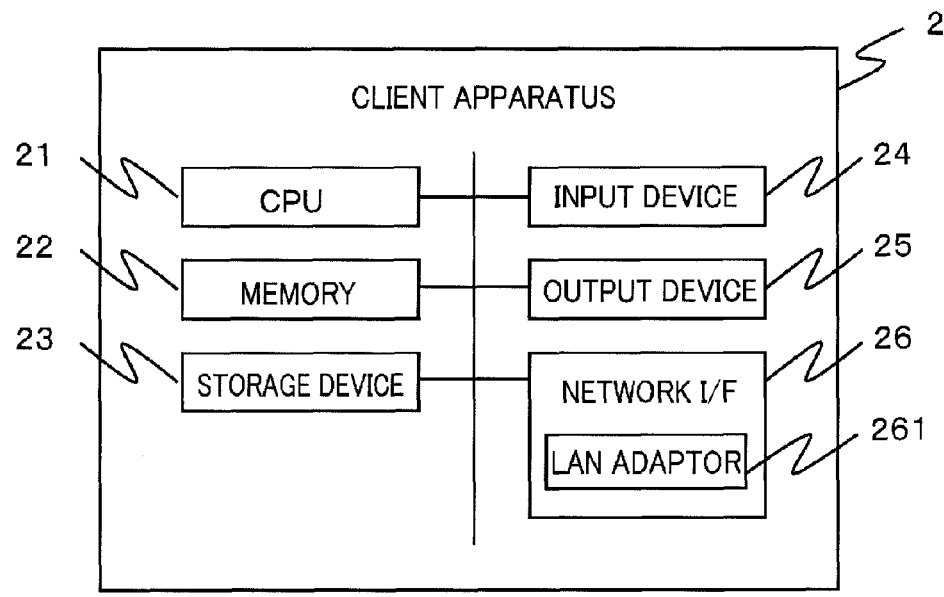
FIG. 2 illustrates an exemplary hardware configuration of a client apparatus 2.

FIG. 2 illustrates exemplary hardware of an information apparatus (computer) that can be used as the client apparatus 2. As illustrated in FIG. 2, the information apparatus includes a CPU 21, a volatile or nonvolatile memory 22 (RAM or ROM), a storage device 23 (e.g., a hard disk drive, a semiconductor memory (SSD (Solid State Drive)), an input device 24 such as a keyboard and a mouse, an output device such as a liquid crystal monitor and a printer, a network interface (hereinafter, network I/F 26) such as an MC (Network Interface Card) (hereinafter, LAN adaptor 261), and a clock device 27 including a timer circuit, a RTC (Real Time Clock), and the like.

The server apparatus 3 is an information apparatus (computer) that utilizes a storage area (data storage area) provided by the storage apparatus 10. The server apparatus 3 is configured by using a personal computer, a mainframe, an office computer, or the like. Upon an access to the storage area, the server apparatus 3 sends (issues) a data frame (hereinafter, abbreviated as frame) including a data I/O request (such as data write request or data read request) to the storage apparatus 10.

Figure 3:
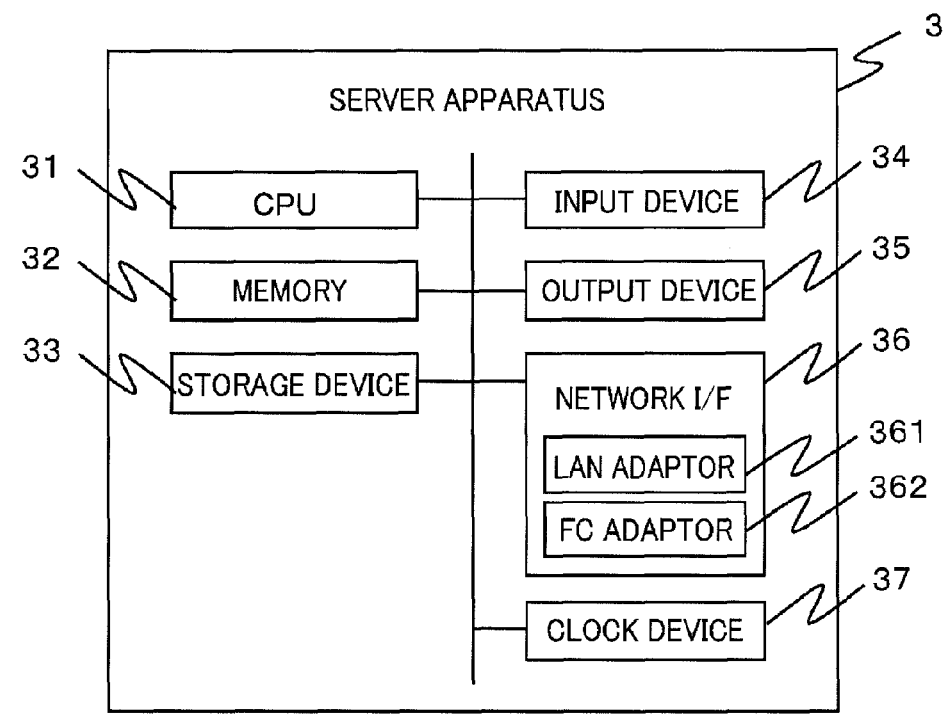
FIG. 3 illustrates an exemplary hardware configuration of a server apparatus 3.

FIG. 3 illustrates exemplary hardware of an information apparatus (computer) that can be used as the server apparatus 3. As illustrated in FIG. 3, this apparatus includes a CPU 31, a volatile or nonvolatile memory 32 (RAM or ROM), a storage device 33 (e.g., a hard disk drive, a semiconductor memory (SSD (Solid State Drive)), an input device 34 such as a keyboard and a mouse, an output device 35 such as a liquid crystal monitor and a printer, a network interface (hereinafter, network I/F 36) such as an NIC (Network Interface Card) (hereinafter, LAN adaptor 261) and an HBA (hereinafter, FC adaptor 362), and a clock device 37 including a timer circuit, a RTC, and the like.

Figure 4:
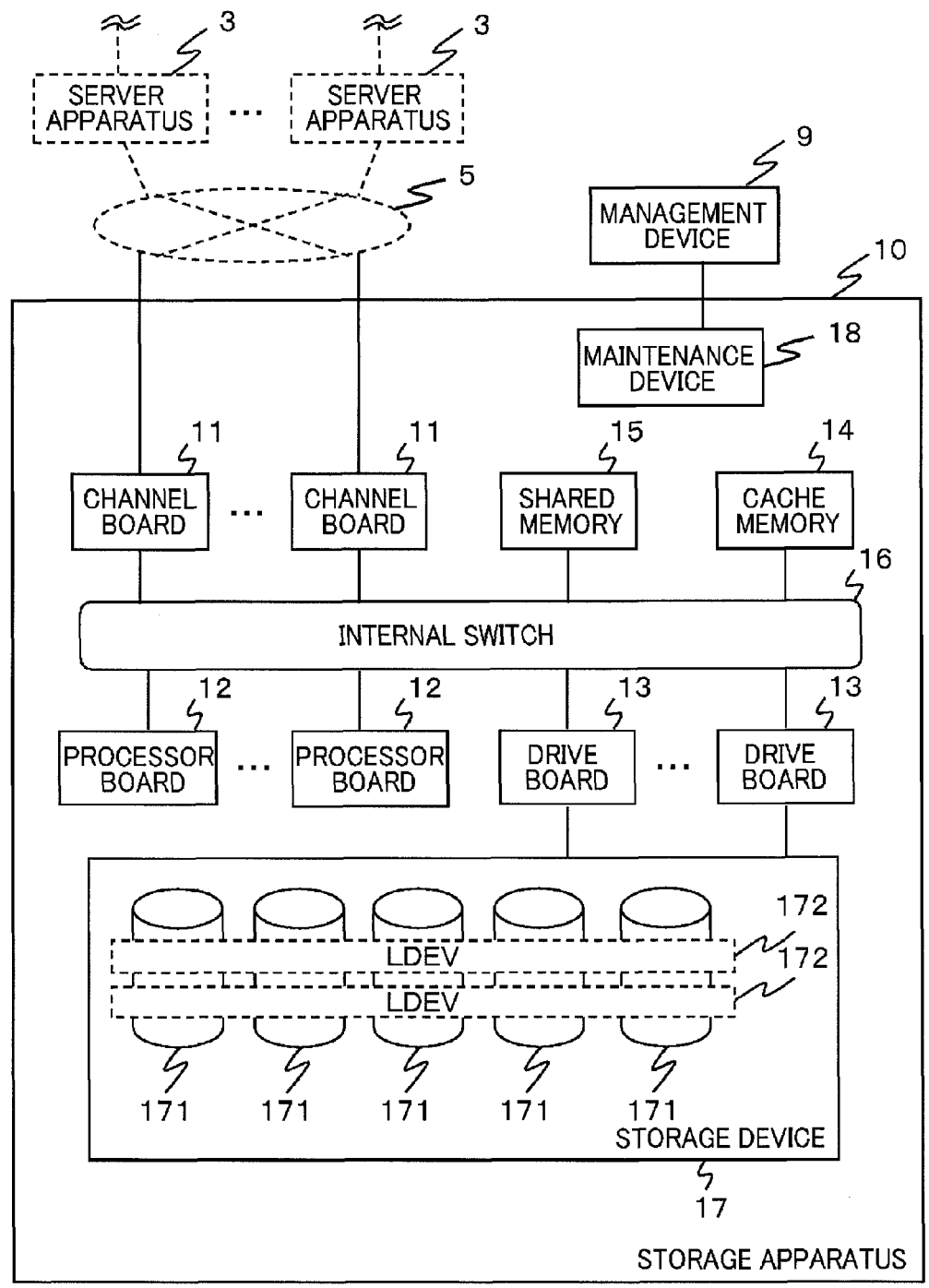
FIG. 4 illustrates an exemplary hardware configuration of a storage apparatus 10.

FIG. 4 illustrates an exemplary hardware configuration of the storage apparatus 10. In response to the I/O request sent from the server apparatus 3, the storage apparatus 10 accesses a storage media and sends data and a response to the server apparatus 3. The storage apparatus 10 is for example a disk array device. As illustrated in FIG. 4, the storage apparatus 10 includes at least one channel board 11 (channel control unit), at least one processor board 12 (MicroProcessor) (processor control unit), at least one drive board 13 (drive control unit), a cache memory 14, a shared memory 15, an internal switch 16, a storage device 17, and a maintenance device 18 (SVP: SerVice Processor). The channel board 11, the processor board 12, the drive board 13, the cache memory 14, and the shared memory 15 are communicatively coupled with each other via the internal switch 16.

The channel board 11 receives a frame sent from the server apparatus 3 and sends the server apparatus 3 a frame including a response (e.g., read data, report on completion of reading, or report on completion of writing) to the data I/O request in the received frame. In the description below, a frame is a Fibre Channel frame (FC frame (FC: Fibre Channel)).

In response to the data I/O request in the frame received by the channel board 11, the processor board 12 performs a process related to data transfer among the channel board 11, the drive board 13, and the cache memory 14. The processor board 12 performs delivery of data (data read from the storage device 17 or data to be written into the storage device 17) between the channel board 11 and the drive board 13 via the cache memory 14. The processor board 12 also performs staging (reading of data from the storage device 17) and de-staging (writing of data into the storage device 17) of data stored in the cache memory 14.

The cache memory 14 is configured by using a RAM (Random Access Memory). The cache memory 14 stores therein data to be written into the storage device 17 (hereinafter, write data), data read from the storage device 17 (hereinafter, read data), and the like. The shared memory 15 stores therein various kinds of information used for controlling the storage apparatus 10.

The drive board 13 performs communication with the storage device 17 in case of an event where data is read from the storage device 17 or data is written into the storage device 17. The internal switch 16 is configured by using for example a high-speed cross bar switch. The communication via the internal switch 16 is performed according to a protocol such as Fibre Channel, iSCSI, or TCP/IP.

The storage device 17 includes a plurality of storage drives 171. Each storage drive 171 is for example a hard disk drive or a semiconductor memory (SSD) of such type as SAS (Serial Attached SCSI), SATA (Serial ATA), FC (Fibre Channel), PATA (Parallel ATA), or SCSI.

The storage device 17 provides storage areas each as a unit of logical storage area obtained by controlling the storage drives 171 in accordance with a RAID (Redundant Arrays of Inexpensive (or Independent) Disks) scheme or the like. The logical storage areas are for example logical devices (LDEVs 172 (LDEV: Logical Device)) configured by using a RAID group (parity group). Further, the storage apparatus 10 provides the server apparatus 3 with logical storage areas (hereinafter, LUs (Logical Units, Logical Volumes (first logical volume, second logical volume)) configured by using the LDEVs 172.

Each LDEV 172 is for example a unit of storage area that is specified by an initiator as a target in SCSI (SCSI: Small Computer System Interface) standard and ATAPI (Attachment Packet Interface) standard. The storage apparatus 10 manages the correspondence (relation) between LUs and the LDEVs 172. According to this correspondence, the storage apparatus 10 specifies an LDEV 172 corresponding to a LU or specifies a LU corresponding to a LDEV 172.

Figure 5A:
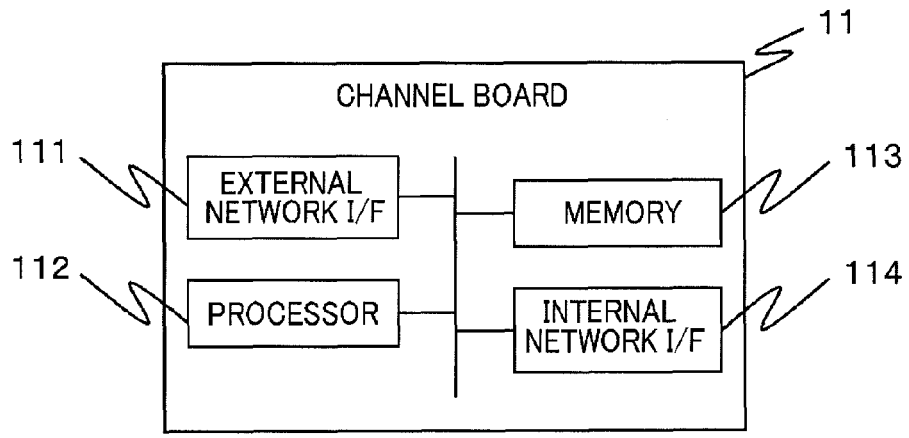
FIG. 5A illustrates an exemplary hardware configuration of a channel board 11.

FIG. 5A illustrates a hardware configuration of the channel board 11. As illustrated in FIG. 5A, the channel board 11 includes an external network interface (hereinafter, external network I/F 111) that includes a port (network port) for communicating with the server apparatus 3, a processor 112 (including a frame processing chip and a frame transfer chip described later), a memory 113, an internal network interface (hereinafter, internal network I/F 114) that includes a port (network port) for communicating with the processor board 12.

The external I/F 111 is configured by using an MC (Network Interface Card), an HBA (Host Bus Adaptor), and the like. The processor 112 is configured by using a CPU (Central Processing Unit), an MPC (Micro Processing Unit), or the like. The memory 113 is a RAM (Random Access Memory) or a ROM (Read Only Memory). The memory 113 stores therein micro programs. Various kinds of functions provided by the channel board 11 are implemented by the processor 112 reading the micro programs from the memory 113 and executing the micro programs. The internal network I/F 114 performs communication with the processor board 12, the drive board 13, the cache memory 14, and the shared memory 15 via the internal switch 16.

Figure 5B:
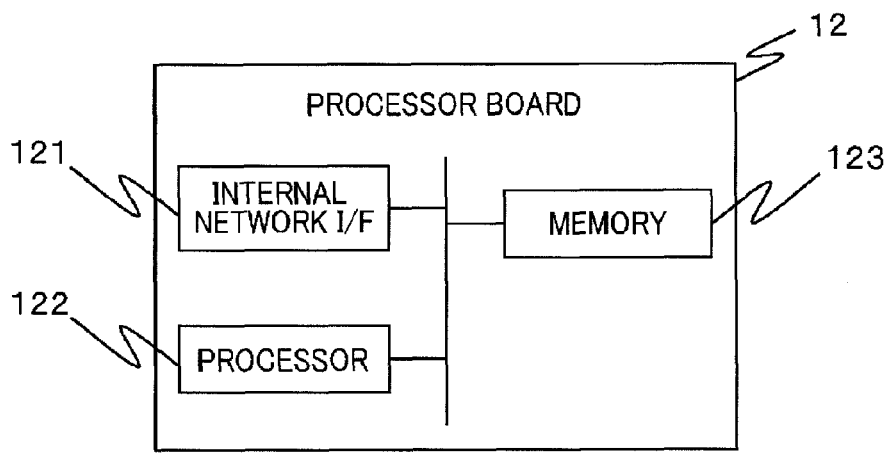
FIG. 5B illustrates an exemplary hardware configuration of a processor board 12.

FIG. 5B illustrates a hardware configuration of the processor board 12. The processor board 12 includes an internal network interface (hereinafter, internal network I/F 121), a processor 122, and a memory 123 (local memory) that has high access performance (that can be accessed at a high speed) from the processor 122 compared with the shared memory 15. The memory 123 stores therein micro programs. Various kinds of functions provided by the processor board 12 are implemented by the processor 122 reading the micro programs from the memory 123 and executing the micro programs.

The internal network I/F 121 performs communication with the channel board 11, the drive board 13, the cache memory 14, and the shared memory 15 via the internal switch 16. The processor 122 is configured by using a CPU, an MPU, a DMA (Direct Memory Access), etc. The memory 123 is a RAM or a ROM. The processor 122 can access both the memory 123 and the shared memory 15.

Figure 5C:
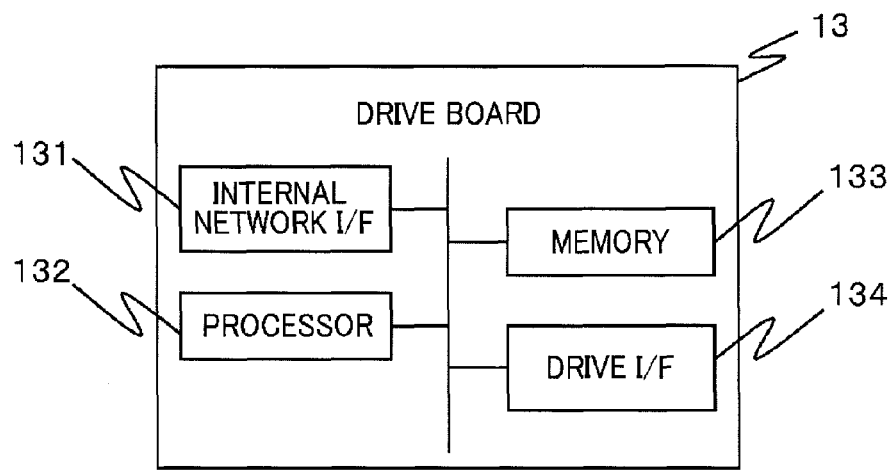
FIG. 5C illustrates an exemplary hardware configuration of a drive board 13.

FIG. 5C illustrates a hardware configuration of the drive board 13. The drive board 13 includes an internal network interface (hereinafter, internal network I/F 131), a processor 132, a memory 133, and a drive interface (hereinafter, drive I/F 134). The memory 133 stores therein micro programs. Various kinds of functions provided by the drive board 13 are implemented by the processor 132 reading the micro programs from the memory 133 and executing the micro programs. The internal network I/F 131 performs communication with the channel board 11, the processor board 12, the cache memory 14, and the shared memory 15 via the internal switch 16. The processor 132 is configured by using a CPU, an MPU, or the like. The memory 133 is for example a RAM or a ROM. The drive I/F 134 performs communication with the storage device 17.

The maintenance device 18 illustrated in FIG. 4 controls and monitors statuses of the components of the storage apparatus 10. The maintenance device 18 is a personal computer, an office computer, or the like. The maintenance device 18 performs communication with components of the storage apparatus 10 such as the channel board 11, the processor board 12, the drive board 13, the cache memory 14, the shared memory 15, and the internal switch 16 via communication means such as the internal switch 16 or a LAN as needed. Then, the maintenance device 18 acquires operation information and the like from each component and provides a management device 9 with the operation information. Further, on the basis of control information and operation information sent from the management device 9, the maintenance device 18 performs setting, control, and maintenance (including installing and updating of software) on the components.

The management device 9 is a computer that is communicatively coupled with the maintenance device 18 via a LAN or the like. The management device 9 has a user interface using a GUI (Graphical User Interface) and a CLI (Command Line Interface) for controlling and monitoring the storage apparatus 10.

Figure 5D:
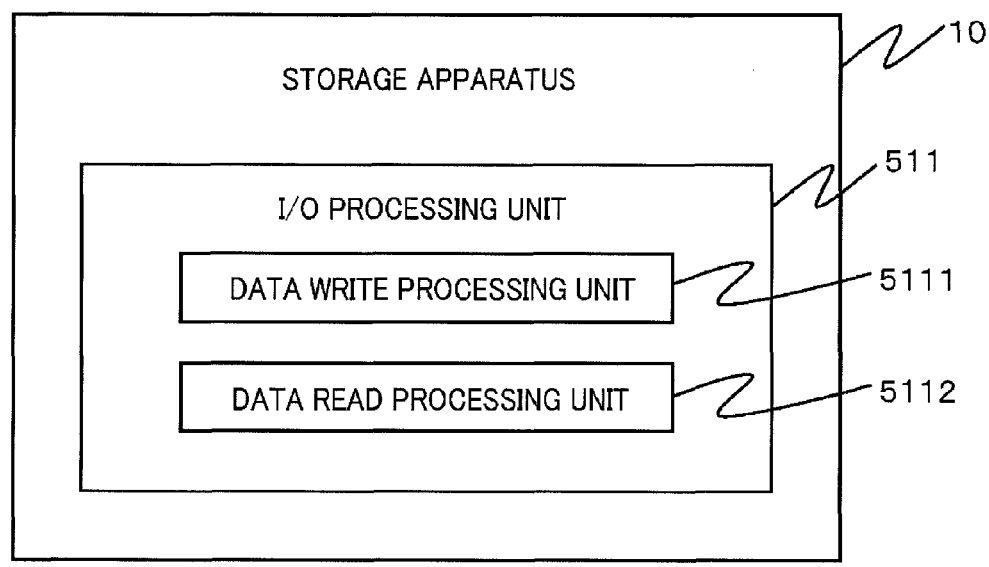
FIG. 5D illustrates primary functions of the storage apparatus 10.

FIG. 5D illustrates primary functions for implementing the services which the storage apparatus 10 provides to the server apparatus 3. As illustrated in FIG. 5D, the storage apparatus 10 includes an I/O processing unit 511 and a shredding processing unit 512. The I/O processing unit 511 includes a data write processing unit 5111 that performs a process related to writing of data into the storage device 17, and a data read processing unit 5112 that performs a process related to reading of data from the storage device 17.

The functions of the I/O processing unit 511 are implemented when the micro programs stored in the memories 113, 123 and 133 are read and executed by hardware of the channel board 11, the processor board 12, and the drive board 13 or the processors 112, 122 and 132 of the storage apparatus 10.

Figure 6:
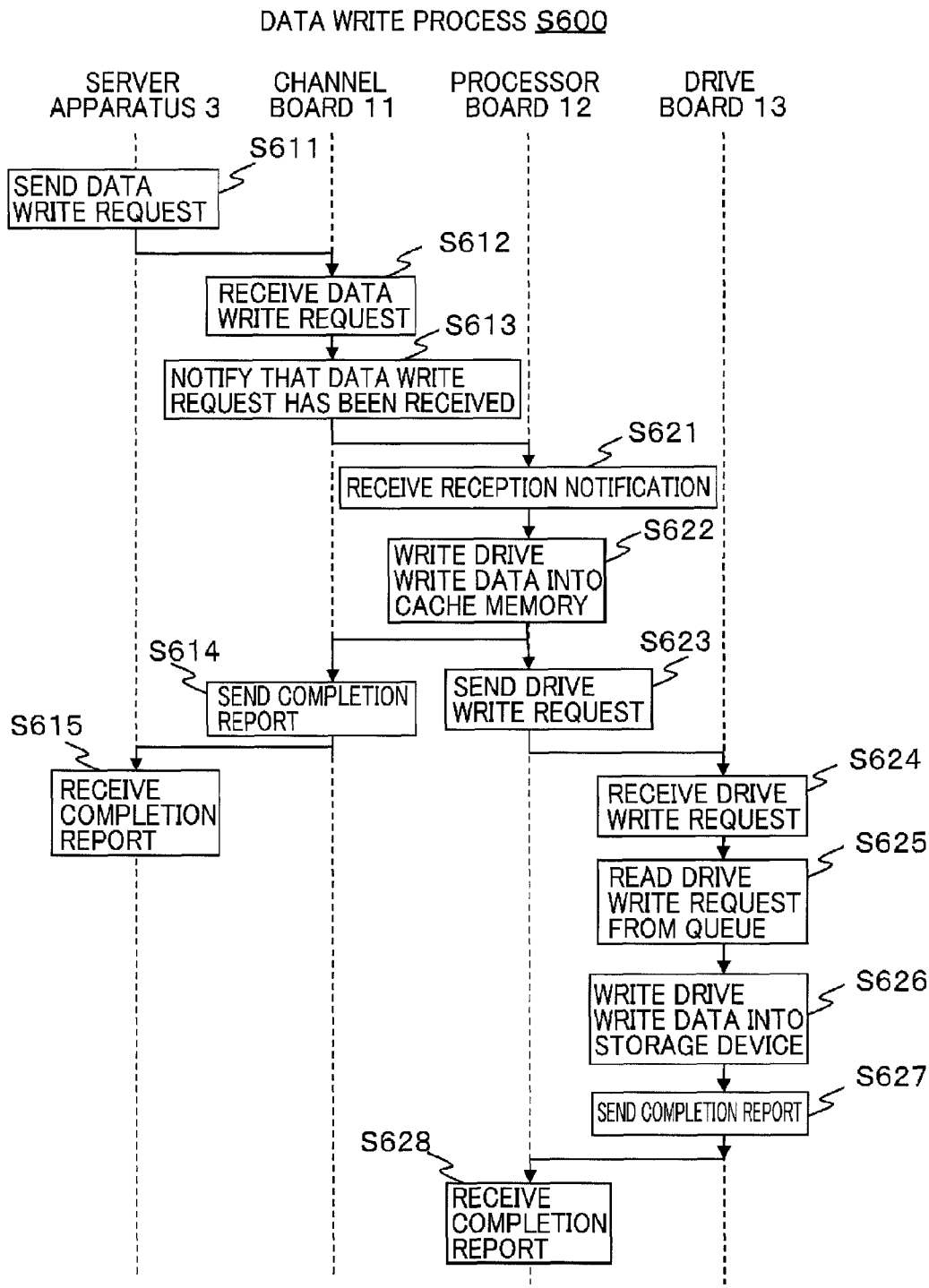
FIG. 6 is a flowchart illustrating a data write process 5600.

FIG. 6 is a flowchart illustrating a process (hereinafter, data write process S600) that is performed by the data write processing unit 5111 of the I/O processing unit 511 when the storage apparatus 10 receives a frame including a data write request from the server apparatus 3. The data write process S600 is described below with reference to FIG. 6. In the description below, "S" given before a reference numeral stands for step.

A frame sent from the server apparatus 3 is received by the channel board 11 of the storage apparatus 10 (S611, S612). Upon receiving the frame, the channel board 11 notifies the processor board 12 and the drive board 13 that the frame has been received (S613).

When the processor board 12 receives the notification from the channel board 11 (S621), the processor board 12 creates a drive write request based on the data write request of the frame and stores write data in the cache memory 14. The processor board 12 sends the created drive write request to the drive board 13 (S622, S623). The channel board 11 sends a completion report to the server apparatus 3 (S614), and then the server apparatus 3 receives the completion report (S615).

Upon receiving the drive write request, the drive board 13 stores the drive write request in a write process waiting queue (S624). The drive board 13 reads the drive write request from the write process waiting queue as needed (S625). The drive board 13 reads the write data specified by the read drive write request from the cache memory 14 and writes the read write data into the storage drive 171 (S626).

The drive board 13 notifies the processor board 12 of a report (completion report) indicating that writing of the write data regarding the drive write request has been completed (S627), and then the processor board 12 receives the sent completion report (S628).

Figure 7:
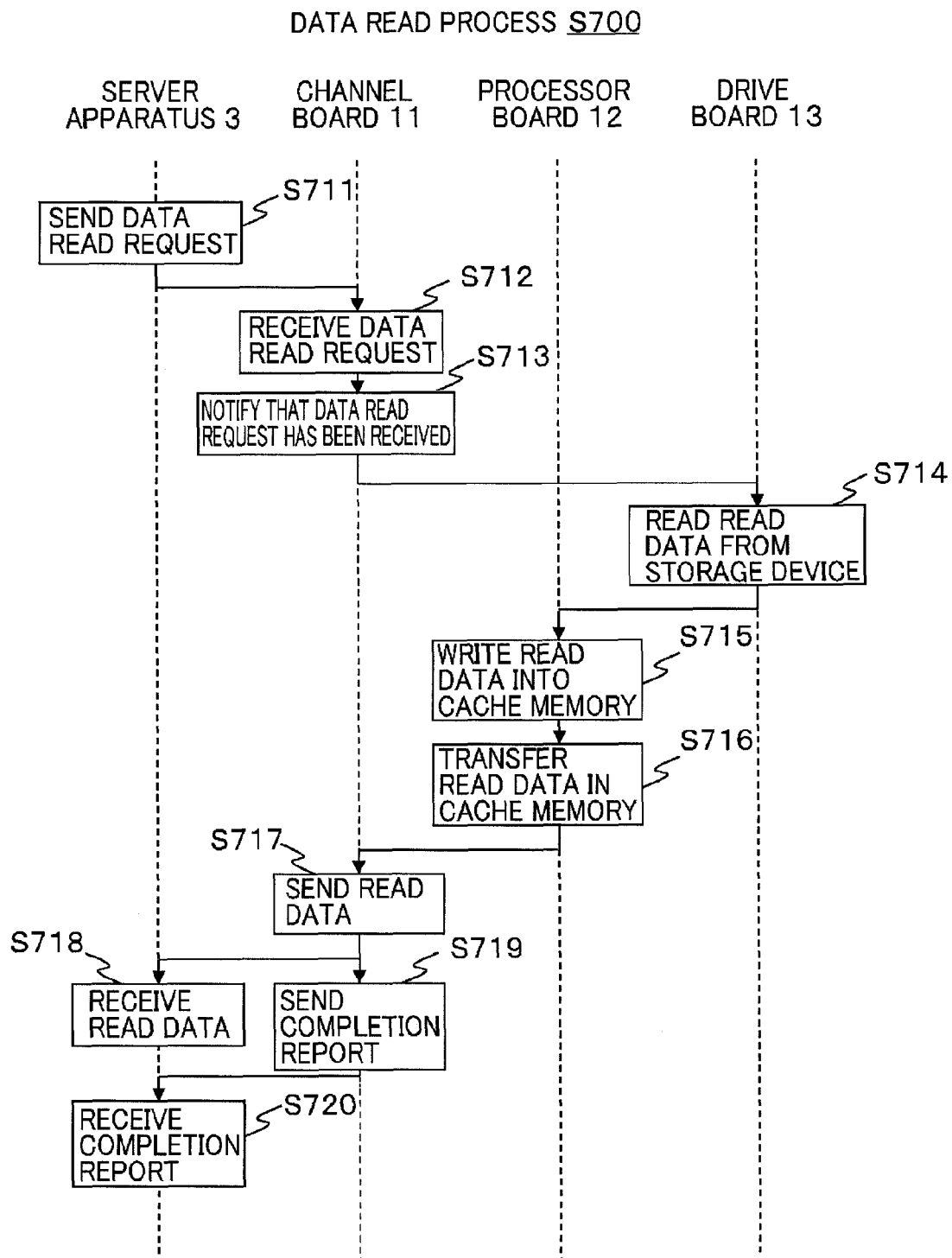
FIG. 7 is a flowchart illustrating a data read process 5700.

FIG. 7 is a flowchart illustrating an I/O process (hereinafter, data read process 5700) that is performed by the data read processing unit 5112 of the I/O processing unit 511 in the storage apparatus 10 when the storage apparatus 10 receives a frame including a data read request from the server apparatus 3. The data read process S700 is described below with reference to FIG. 7.

A frame sent from the server apparatus 3 is received by the channel board 11 of the storage apparatus 10 (S711, S712). Upon receiving the frame from the server apparatus 3, the channel board 11 notifies the processor board 12 and the drive board 13 that the frame has been received (S713).

Upon receiving the notification from the channel board 11, the drive board 13 reads data specified by the data read request in the frame from the storage device 17 (storage drives 171) (for example, data specified with an LBA (Logical Block Address)) (S714). When the read data is present in the cache memory 14 (i.e., in case of a cache hit), the read process (S715) from the storage device 17 is omitted. The processor board 12 writes data read by the drive board 13 into the cache memory 14 (S715). The processor board 12 transfers the data written into the cache memory 14 to the network I/F as needed (S716).

The channel board 11 sequentially sends the read data, which is sent from the processor board 12, to the server apparatus 3 (S717, S718). After completion of the sending of the read data, the channel board 11 sends a completion report to the server apparatus 3 (S719), and then the server apparatus 3 receives the sent completion report (S720).

The following describes primary functions of the client apparatus 2, the server apparatus 3, and the storage apparatus 10.

Figures 8A, 8B:
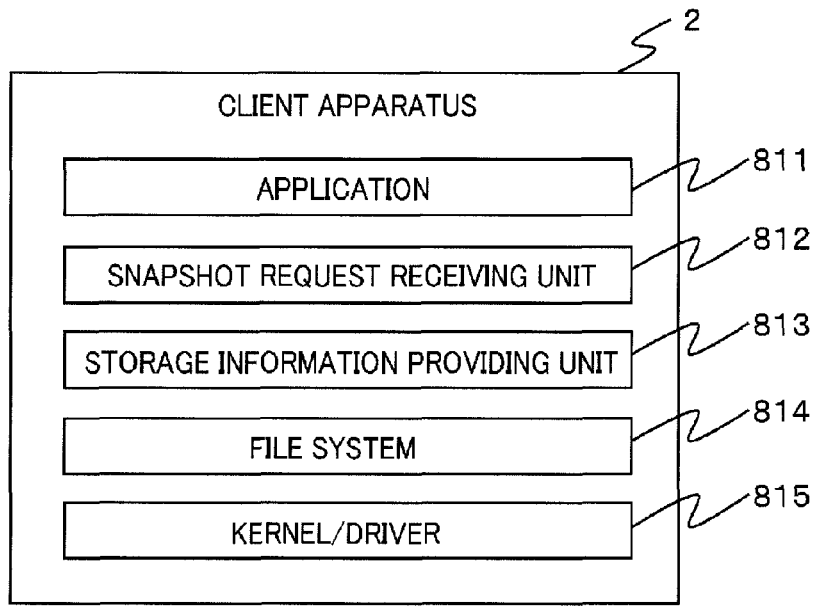
FIG. 8A is a diagram illustrating primary functions provided by the client apparatus 2.
FIG. 8B illustrates an exemplary snapshot acquisition request reception screen 850.

FIG. 8A illustrates primary functions provided by the client apparatus 2. As illustrated in FIG. 8A, the client apparatus 2 provides functions of various kinds of applications 811, a snapshot request processing unit 812, a storage information providing unit 813, a file system 814, and a kernel/driver 815. These functions are implemented when programs stored in the memory 22 and the storage device 23 are read and executed by the CPU 21 of the client apparatus 2. The file system 814 and the kernel/driver 815 are implemented for example as functions of the operating system installed in the client apparatus 2.

The application 811 in FIG. 8A is implemented for example by application software that is run on the operating system. The snapshot request processing unit 812 receives a snapshot acquisition request on a LU basis from a user and sends the received snapshot acquisition request (including information with which the target LU of the snapshot is specified (e.g., LUN)) to the server apparatus 3. FIG. 8B illustrates an exemplary screen (hereinafter, snapshot acquisition request reception screen 850) that is displayed in the client apparatus 2 when the snapshot request processing unit 812 acquires a snapshot upon receiving a shredding instruction from the user.

The storage information providing unit 813 provides a user with information that is needed for monitoring and controlling the LUs of the file storage system 7 or the archive storage system 8. For example, the storage information providing unit 813 acquires, from the file storage system 7 or the archive storage system 8, a volume configuration table 922, a snapshot management table 923, and a snapshot configuration table 924 and displays these.

The file system 814 illustrated in FIG. 8A provides the client apparatus 2 with functions related to I/O to and from an LU on a file basis (by specifying a file name) or on a directory (folder) basis (by specifying a directory name (folder name)). The file system 814 is based for example on an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The kernel/driver 815 is implemented by executing a kernel module and a driver module constituting software of the operating system. The kernel module includes programs for implementing fundamental functions of the operating system, e.g., management of processes, scheduling of processes, management of storage areas, handling of interrupting requests from hardware, and the like, for the software executed by the client apparatus 2. Further, the driver module includes programs with which the kernel module performs communication with hardware constituting the client apparatus 2, and a peripheral device used while being coupled with the client apparatus 2.

Figure 9:
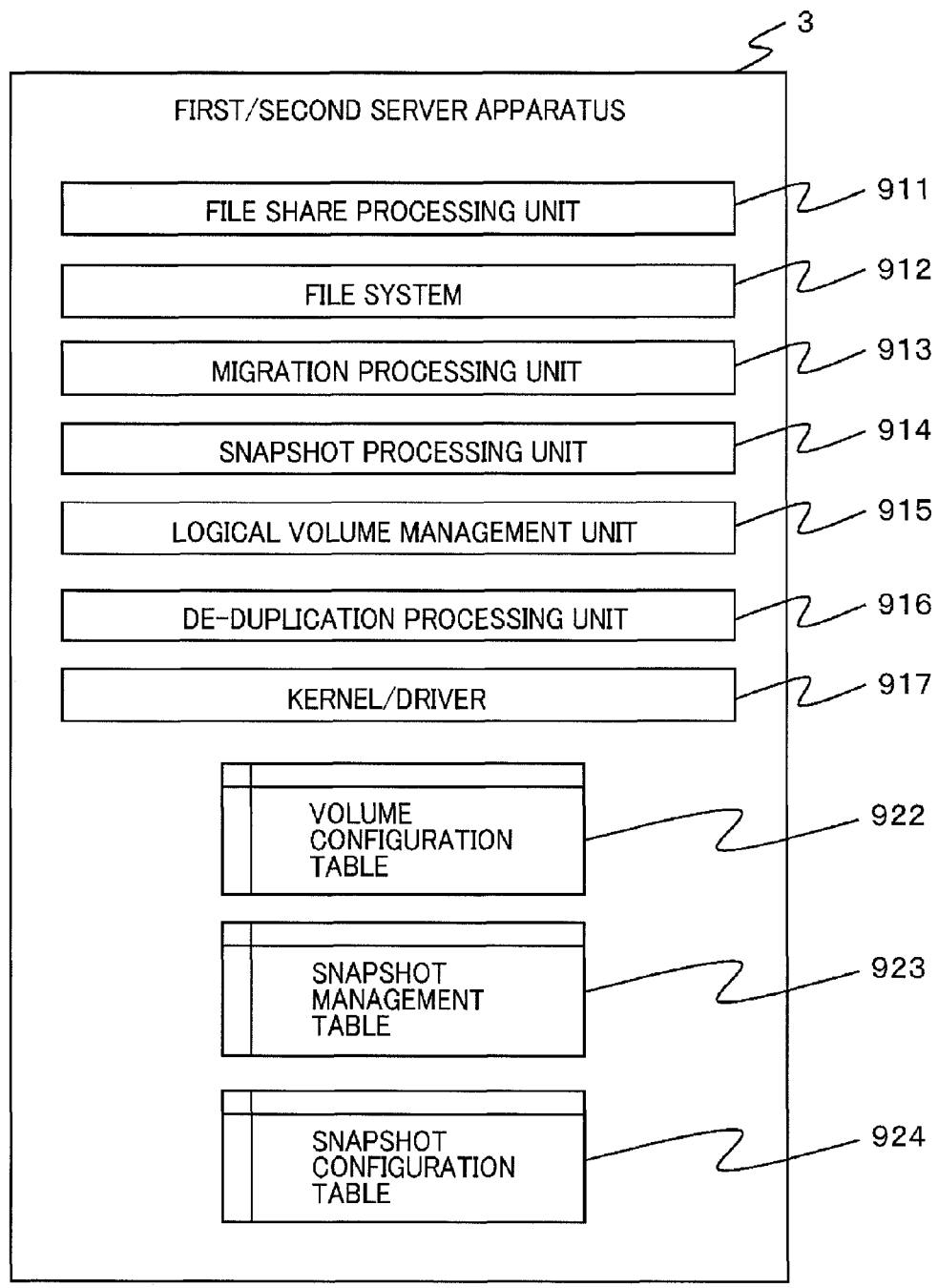
FIG. 9 is a diagram illustrating primary functions of the server apparatus 3 and data (table) managed in the server apparatus 3.

FIG. 9 illustrates primary functions of the server apparatus 3 and data (table) managed in the server apparatus 3. As illustrated in FIG. 9, the server apparatus 3 includes functions of a file share processing unit 911, a file system 912, a migration processing unit 913, a snapshot processing unit 914, a logical volume management unit 915, a de-duplication processing unit 916, and a kernel/driver 917. The migration processing unit 913 and the snapshot processing unit 914 may be implemented as functions of the file system 912 or may be implemented as functions that are independent of the file system 912.

The file share processing unit 911 implements, for the client apparatus 2, a file sharing environment between the file storage system 7 and the archive storage system 8. For example, the file share processing unit 911 is implemented by using a protocol of a network file system or the like (distributed file system) such as NFS (Network File System), CIFS (Common Internet File System), or AFS (Andrew File System).

For example, when an I/O request targeting the storage area managed in the archive storage system 8 is issued by the client apparatus 2 to the first server apparatus 3 of the file storage system 7, the I/O request is forwarded from the first server apparatus 3 to the second server apparatus 3 via the communication network 5 through the cooperation of the file share processing units 911 of the first server apparatus 3 and the second server apparatus 3. Furthermore, for example, when an I/O request targeting the storage area managed in the file storage system 7 is issued by the client apparatus 2 to the second server apparatus 3 of the archive storage system 8, the I/O request is forwarded from the second server apparatus 3 to the first server apparatus 3 to the second server apparatus 3 via the communication network 5 through the cooperation of the file share processing units 911 of the first server apparatus 3 and the second server apparatus 3.

The file system 912 uses an LU provided by the storage apparatus 10 and provides I/O functions to and from an LU on a file basis or on a directory basis for the client apparatus 2. The file system 912 is based for example on an FAT (File Allocation Table), NTFS, HFS (Hierarchical File System), ext2 (second extended file system), ext3 (third extended file system), ext4 (fourth extended file system), UDF (Universal Disk Format), HPFS (High Performance File system), JFS (Journaled File System), UFS (Unix File System), VTOC (Volume Table Of Contents), XFS, or the like.

The migration processing unit 913 migrates (transfers) data managed in the file storage system 7 to the archive storage system 8. The functions related to migration of the migration processing unit 913 are described in detail later.

The snapshot processing unit 914 acquires a snapshot in response to a snapshot acquisition request on a LU basis sent from the client apparatus 2. The functions related to acquisition of snapshots are described in detail later.

The logical volume management unit 915 is implemented for example by using an LVM (LVM: Logical Volume Manager). The logical volume management unit 915 provides LUs by using the LDEVs 172. The logical volume management unit 915 includes a function of enabling the LDEVs 172 to be used as LUs and a function of a device driver for processing writing or reading of data into or from LUs on a block basis. A data block address 1115 in an inode management table 1012 described later is a block address of an LU. In addition, the logical volume management unit 915 performs a process related to switching of DVOLs (differential volumes) described later.

The de-duplication processing unit 916 prevents pieces of data, having the same content, from being stored redundantly in an LU on a file basis. Specifically, the de-duplication processing unit 916 compares the contents of files with each other and determines whether or not the file contents are the same. Then, a common data block of an LU is used for the entities of files whose contents are determined as being the same, i.e., a common entity is used as the entities of data associated with the same file name. For example, as for the files whose contents are determined as being the same, the reference destination of an inode (the data block address of the inode management table 1012 described later) is set to belong to a common data block address.

The kernel/driver 917 is implemented by executing the kernel module and the driver module constituting software of the operating system. The kernel module includes programs for implementing fundamental functions of the operating system, e.g., management of processes, scheduling of processes, management of storage areas, handling of interrupting requests from hardware, and the like, for the software executed by the server apparatus 3. Further, the driver module includes programs with which the kernel module performs communication with hardware constituting the server apparatus 3, and a peripheral device used while being coupled with the server apparatus 3.

As illustrated in FIG. 9, the server apparatus 3 manages the volume configuration table 922, the snapshot management table 923, and the snapshot configuration table 924. These pieces of data are stored for example in the memory 32 of the server apparatus 3, the storage device 33 of the server apparatus 3, and the storage apparatus 10 (LU). The tables are described in detail later.

<File System>

Figure 10:
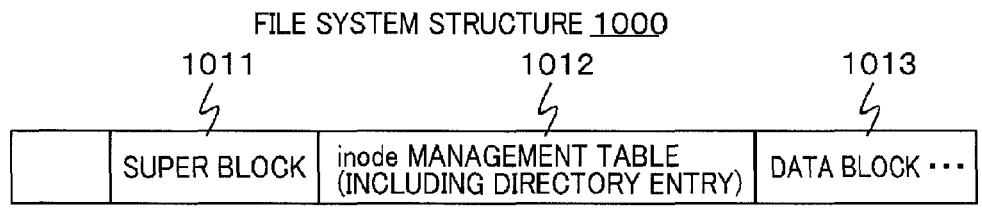
FIG. 10 is a diagram illustrating an exemplary file system structure 1000.

The functions of the file system 912 are described below. FIG. 10 illustrates an exemplary structure of data managed in an LU by the file system 912 (hereinafter, file system structure 1000). As illustrated in FIG. 10, the file system structure 1000 includes storage areas: a super block 1011, an inode management table 1012, and a data block 1013 where entities (data) of files are stored.

The super block 1011 stores therein information on partitions provided to an LU. The super block 1011 is made for each disk partition in an ordinary case. The super block 1011 stores therein information such as the number of data blocks, a block size, the number of unused blocks, the number of unused inodes within a partition, the mounted number of partitions, and elapsed time since the last consistency check.

The inode management table 1012 stores therein management information on a file stored in an LU (hereinafter, inode). The inode is set for each file, i.e., a single inode is set for a single file.

Figure 11A:
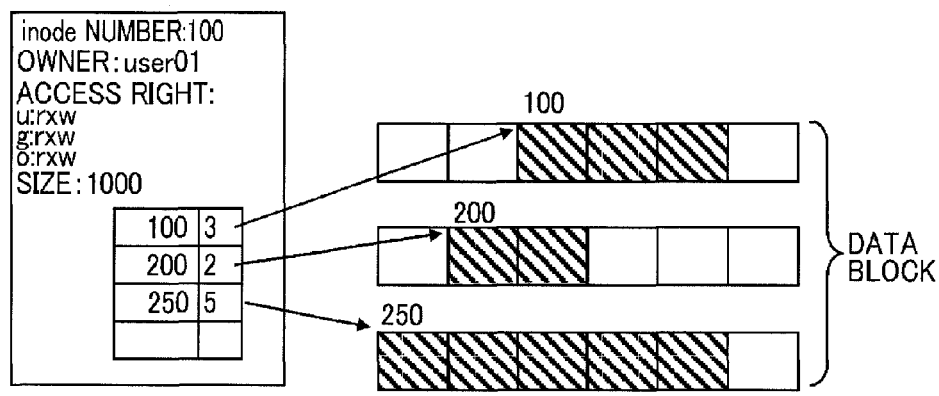
FIG. 11A is a diagram illustrating an inode.
Figure 11B:
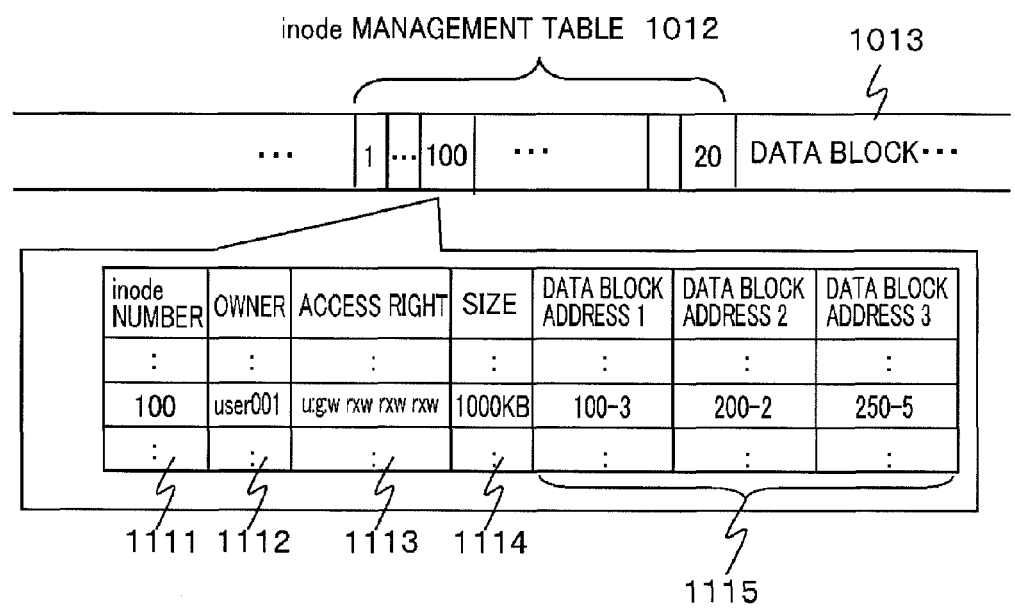
FIG. 11B is a diagram illustrating an inode management table 1012.

FIGS. 11A and 11B illustrate a concept of the inode. As illustrated in FIGS. 11A and 11B, an inode contains information such as an inode number 1111 that is an identifier for identifying each individual inode, an owner 1112 of the file, access right 1113 that is set for the file, a file size 1114 of the file, and information for identifying a data block where the entity (data) of the file is stored (hereinafter, block address 1115).

The inode management table 1012 includes a directory entry (or a directory file). FIG. 12 illustrates an exemplary directory entry 1200. As illustrated in FIG. 12, the directory entry 1200 stores therein a relation between a file path name 1211 and an inode number 1212. The file system 912 refers to the directory entry and identifies an inode number 1212 corresponding to a file path name 1211 or identifies a file path name 1211 corresponding to an inode number 1212.

<Snapshot>

The snapshot processing unit 914 executes various kinds of a process related to acquisition of snapshots. In response to a request from a user or an operator, the snapshot processing unit 914 acquires and manages a status (hereinafter, snapshot) of a primary volume (hereinafter, PVOL (PVOL: Primary VOLume)) at some point of time. The primary volume is an LU operated in the file storage system 7. The snapshot processing unit 914 is able to acquire and manage snapshots of a plurality of generations (statuses of a PVOL at a plurality of different points of time).

The snapshot processing unit 914 executes various kinds of processes relates to snapshots, e.g., receiving of a snapshot acquisition request that is sent from the client apparatus 2, acquisition of a snapshot in accordance with a snapshot request, receiving of a reference request of a snapshot, provision of a snapshot to the client apparatus 2, deletion of a snapshot, and the like.

Specifically, the acquisition of a snapshot means that data stored in a data block in a PVOL (hereinafter, differential data) is saved to a data block in a differential volume (hereinafter, DVOL (Differential VOLume)), which is another LU prepared for managing the differential data.

The reference (or utilization) of a snapshot means that an acquired snapshot is referred to (or used) by the application 811 of the client apparatus 2. The reference or provision of a snapshot indicates that a status of a PVOL at some point of time in the past is created on the basis of data stored in the current PVOL and differential data saved to a DVOL. The deletion of a snapshot indicates that differential data to be deleted is deleted from a DVOL.

The snapshot management table 923 (see FIG. 9) stored in the server apparatus 3 stores therein information related to management of a snapshot. The snapshot management table 923 manages information related to snapshots for each generation. The snapshot processing unit 914 manages snapshots of each generation on the basis of data stored in a PVOL, data stored in a DVOL, and the snapshot management table 923.

Figure 13:
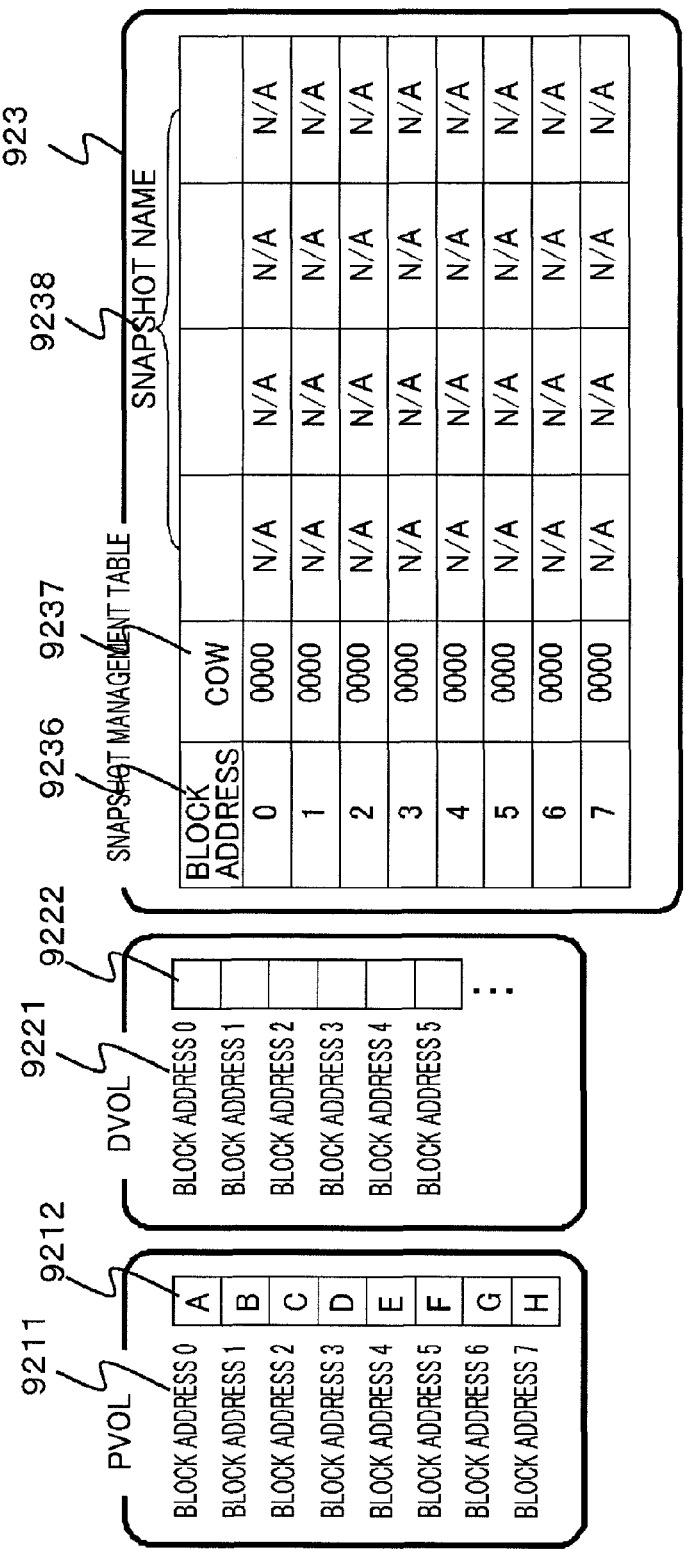
FIG. 13 is a diagram illustrating a relation among a PVOL, a DVOL, and a snapshot management table 923.

FIG. 13 is a diagram illustrating relations among a PVOL, a DVOL, and the snapshot management table 923. As illustrated in FIG. 13, in a PVOL, pieces of data "A" to "H" are stored in this order in blocks 9212 identified by block addresses 9211 (block addresses 0 to 7). Meanwhile, in a DVOL, data blocks 9222 identified by block addresses 9221 (block addresses 0 to 7) are provided.

In the snapshot management table 923, CoW bitmaps 9237 (CoW: Copy on Write) and snapshot names 9238 that are information for identifying snapshots are managed in association with the block addresses 9211 of the PVOL, respectively. Each CoW bitmap 9237 includes a bit array with the number of bits corresponding to acquirable snapshot generations. The bits respectively correspond to the first generation and the second generation and so on of snapshots in order from the most significant bit (left-end bit) to the least significant bit (right-end bit).

FIGS. 14A to 14D are diagrams illustrating processes executed by the snapshot processing unit 914. With reference to FIGS. 14A to 14D, processes executed by the snapshot processing unit 914 are described below, taking as an example a case where data is written into the PVOL. In the description below, both the PVOL and the DVOL have eight data blocks, and the number of manageable snapshot generations is four (i.e., the CoW bitmap 9237 includes four bits).

Figure 14A:
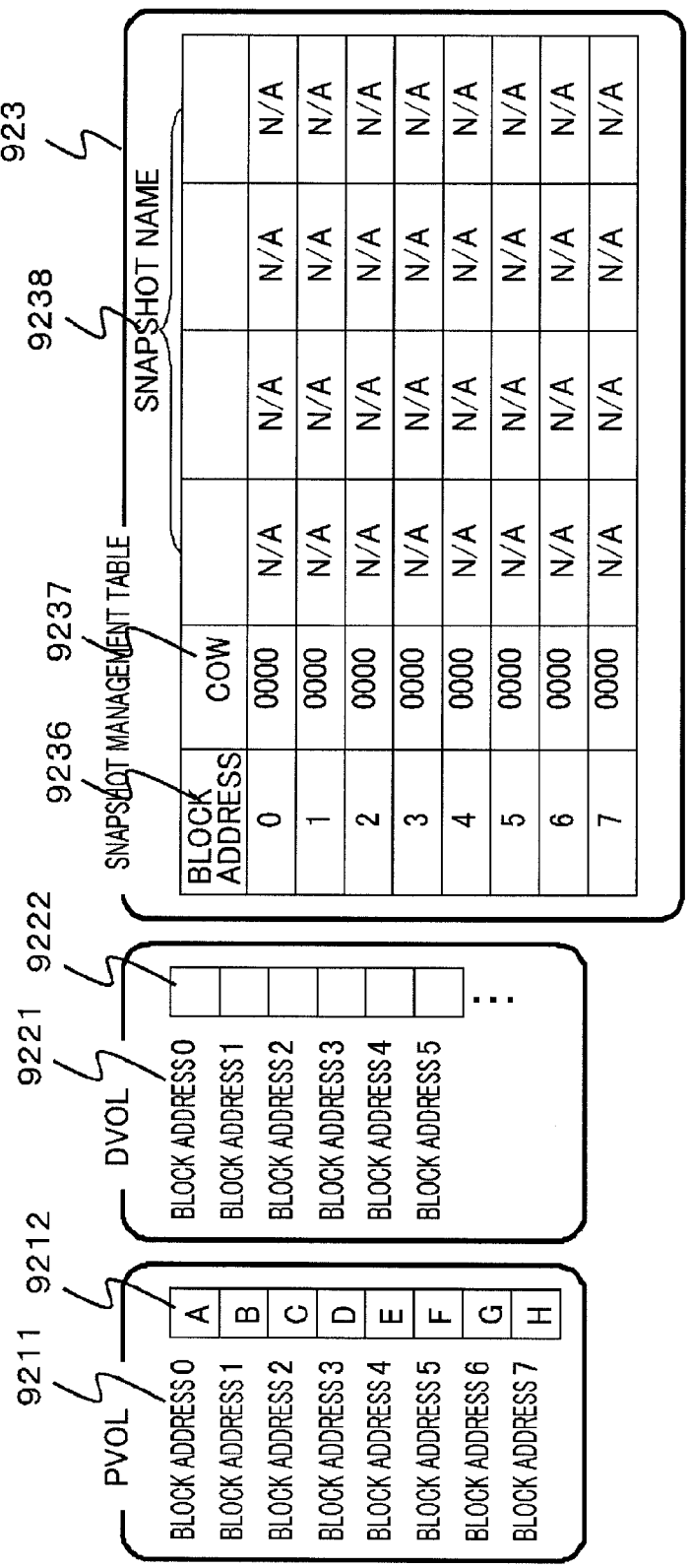
FIG. 14A is a diagram illustrating an initial status of the PVOL, the DVOL, and the snapshot management table 923 before data is written into the PVOL.

FIG. 14A illustrates a status (hereinafter, initial status) of each of the PVOL, the DVOL, and the snapshot management table 923 before data is written into the PVOL. In the initial status, the data blocks 9212 corresponding to the block addresses 0 to 7 in the PVOL store therein pieces of data "A", "B", "C", "D", "E", "F", "G", and "H", respectively. At this moment, no snapshot is acquired, and therefore no useful data is stored in each data block 9222 in the DVOL (for example, space or NULL is stored therein). Further, all bit values of each CoW bitmap 9237 of the snapshot management table 923 are set at "0". No value is set in the fields and contents of the snapshot name 9238 (for example, space or NULL is stored therein).

Figure 14B:
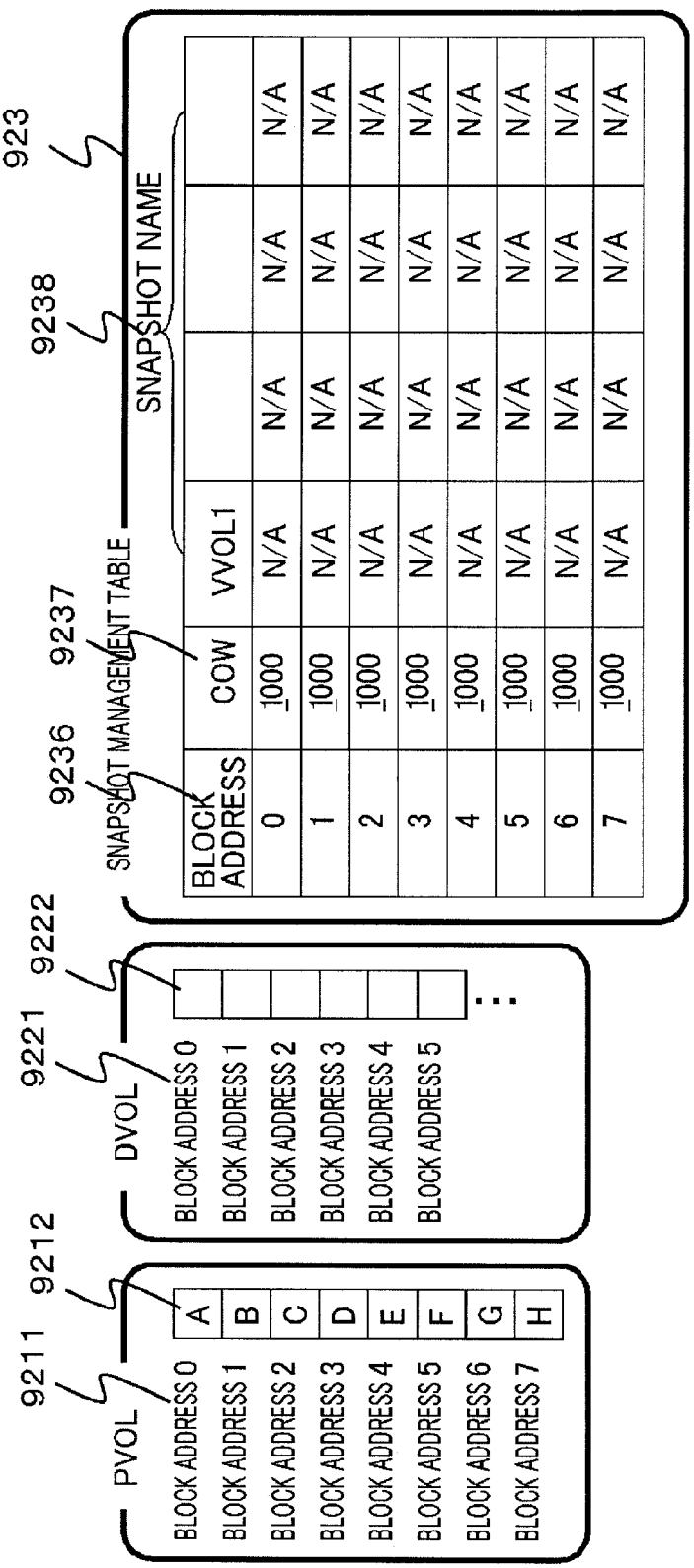
FIG. 14B is a diagram illustrating a status right after a acquisition request of a first snapshot is received from the client apparatus 2 in the initial status.

FIG. 14B illustrates a status right after an acquisition request of the first snapshot (the snapshot name 9238 thereof is "VVOL1") is received from the client apparatus 2 in the initial status of FIG. 14A. As illustrated in FIG. 14B, the most significant bit (left-end bit) of each of the CoW bitmaps 9237 corresponding to the block addresses 9236 "0" to "7" is reversed (is set at "1"). Further, a field of the snapshot name 9238 is set as "VVOL1". At this moment, no snapshot is actually acquired, and therefore nothing is set in the contents corresponding to this field.

Figure 14C:
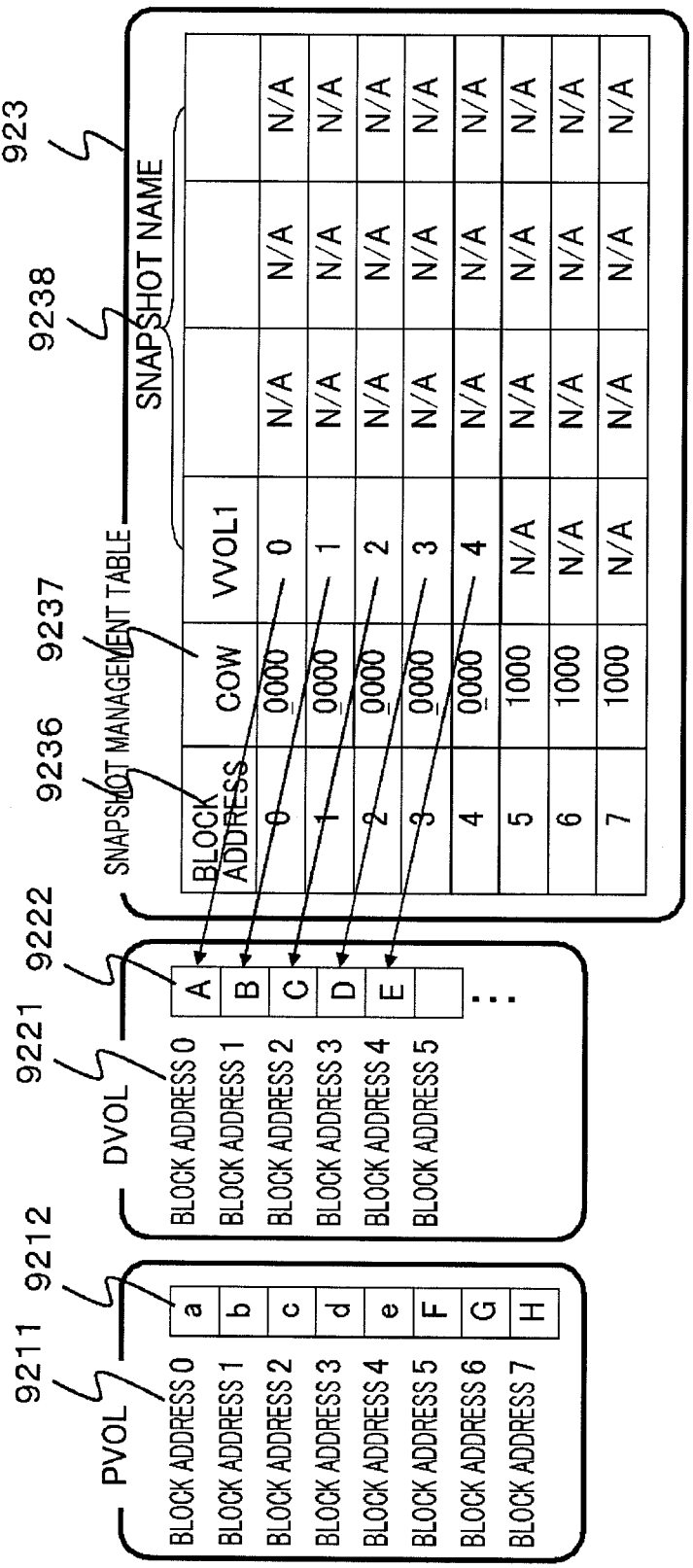
FIG. 14C is a diagram illustrating a status right after each data block in the PVOL is updated in the status of FIG. 14B.

FIG. 14C illustrates a status right after the contents of the data blocks 9212 of the block addresses 0 to 4 in the PVOL are updated (Copy on Write) to "a", "b", "c", "d", "e", respectively, in the status of FIG. 14B. As illustrated in FIG. 14C, the old pieces of data "A", "B", "C", "D", and "E", which have been stored in the block addresses 0 to 4 until the updating, are stored (saved) in the data blocks 9222 of the block addresses 0 to 4 in the DVOL, respectively. Because the snapshot of the first generation is acquired (necessary data is saved to the DVOL), the most significant bit (left-end bit) of each corresponding CoW bitmap 9237 is reversed (is reset to "0"). Thus, all bits of the CoW bitmap 9237 are 0. In this status, CoW (Copy on Write) is not executed even if data of a PVOL is updated. As illustrated in FIG. 14C, the contents of the snapshot belonging to the snapshot name 9238 "VVOL1" are set as block addresses 0 to 4 in the DVOL, to which the old pieces of data "A", "B", "C", "D", and "E" are saved.

Figure 14D:
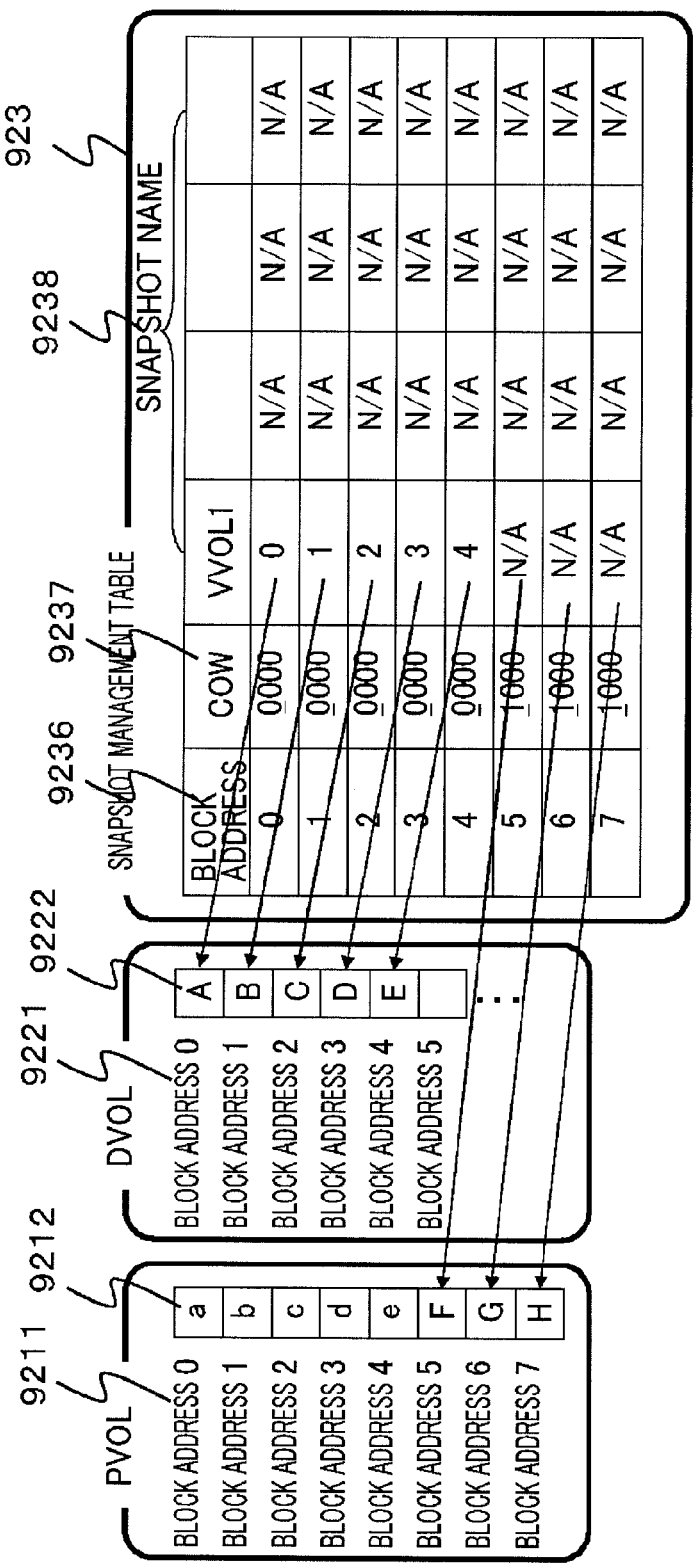
FIG. 14D is a diagram illustrating the PVOL, the DVOL, and the snapshot management table 923 in case where a reference request of a snapshot of the first generation is received from the client apparatus 2 in the status of FIG. 14C.

FIG. 14D illustrates a case where a reference request of the snapshot of the first generation is sent from the client apparatus 2 in the status of FIG. 14C. Firstly, the snapshot processing unit 914 acquires the pieces of data stored in the data blocks 9222 of the block addresses 0 to 4 in the DVOL in order to create a snapshot of the data blocks of the block addresses 0 to 4 in the PVOL. Note that the snapshot processing unit 914 refers to the contents of a column of the snapshot name 9238 "VVOL1" in the snapshot management table 923 to thereby figure out that the snapshot of the first generation in the data blocks of the block addresses 0 to 4 is stored in the block addresses 0 to 4 in the DVOL.

The snapshot processing unit 914 acquires data of the block addresses 5 to 7 from the data blocks in the PVOL. Note that the snapshot processing unit 914 refers to the contents of a column of the snapshot name 9238 "VVOL1" in the snapshot management table 923 to thereby figure out that the block addresses 5 to 7 in the PVOL are not updated.

The snapshot processing unit 914 then creates a snapshot of the entire PVOL on the basis of the data of the block addresses 0 to 4 acquired from the DVOL and the data of the block addresses 5 to 7 acquired from the PVOL. Thereafter, the snapshot processing unit 914 sends the created snapshot to the request source (client apparatus 2).

A case where there is a snapshot acquisition request of the first generation has been described above with reference to FIGS. 14A to 14D. Cases where there are snapshot acquisition requests of the second to fourth generations are processed in the same way as the first generation.

<Switching of DVOL>

As described previously, differential data is stored in a DVOL every time a snapshot is acquired. Therefore, when the capacity of the DVOL is lacking, a new DVOL needs to be prepared and switching needs to be performed so that the differential data may be stored in the new DVOL.

Figure 15A:
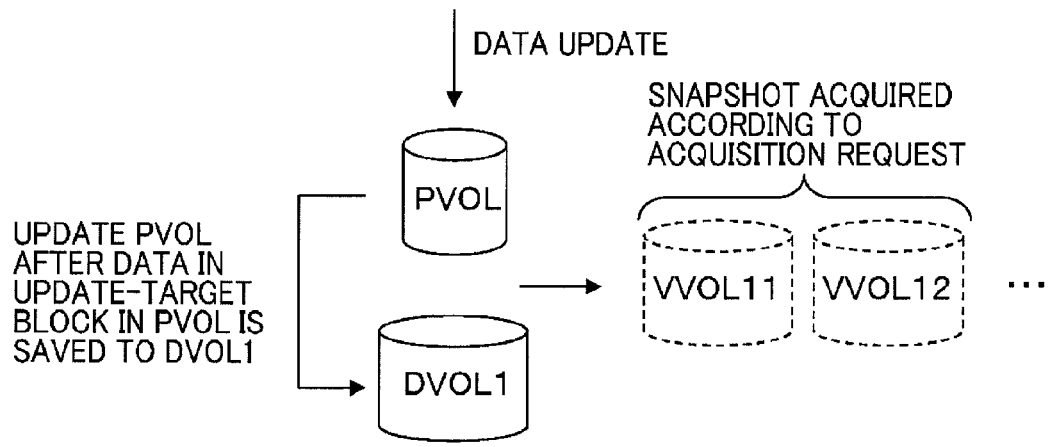
FIG. 15A is a diagram illustrating a method of switching DVOLs.
Figure 15B:
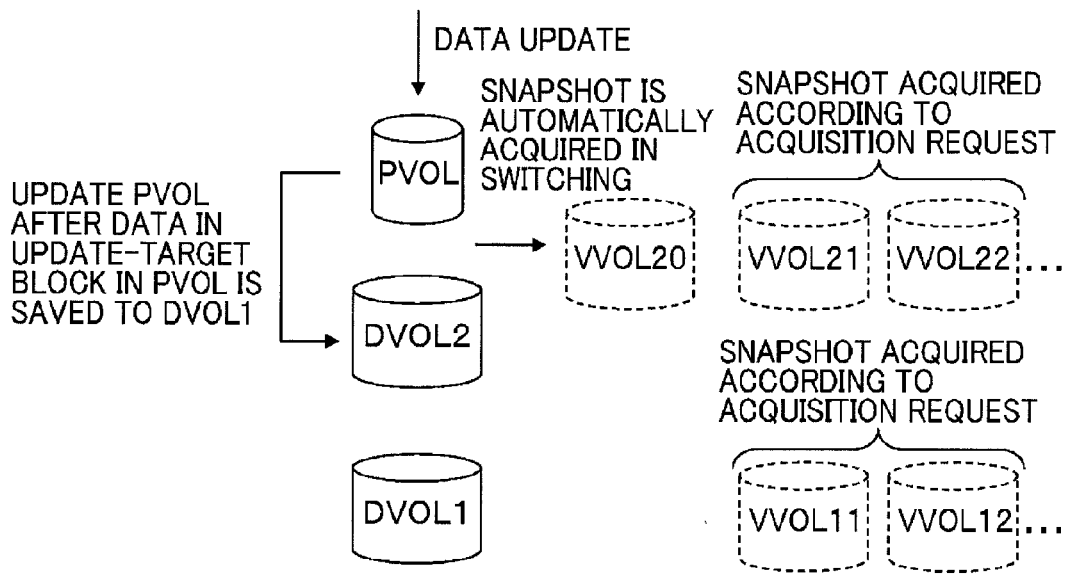
FIG. 15B is a diagram illustrating the method of switching DVOLs.
Figure 15C:
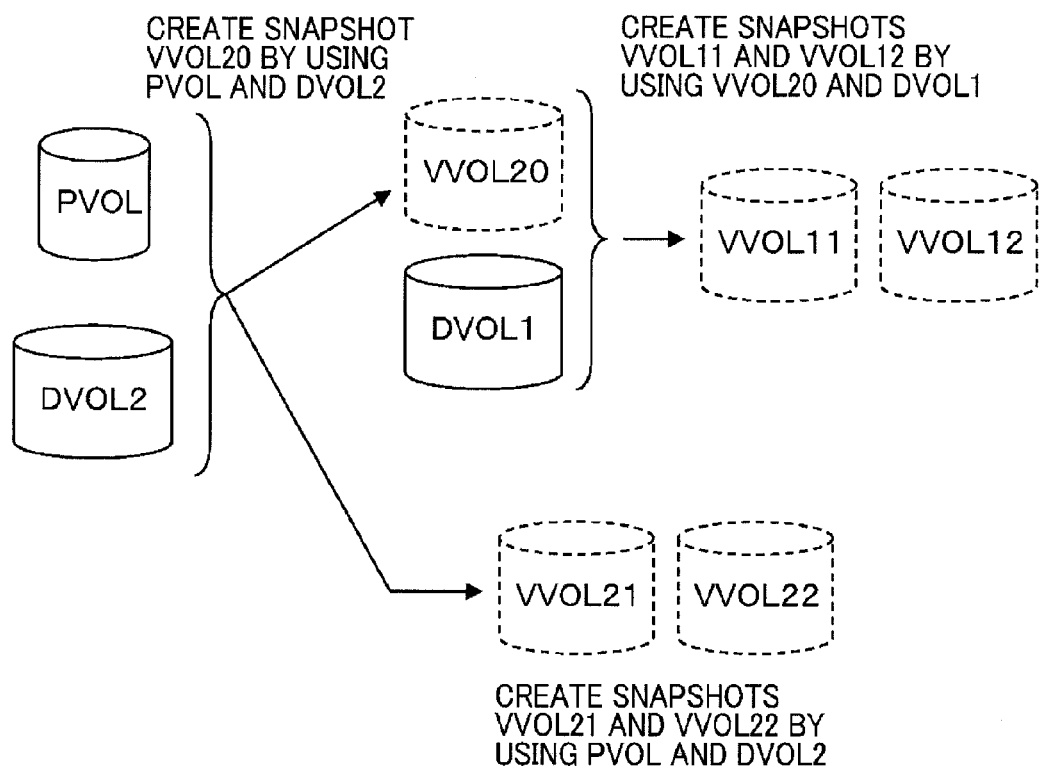
FIG. 15C is a diagram illustrating the method of switching DVOLs.

FIGS. 15A to 15C are diagrams illustrating a method of switching DVOLs performed by the snapshot processing unit 914. The switching of DVOLs is described below with reference to FIGS. 15A to 15C. In FIGS. 15A to 15C, a solid line represents an LU while a dotted line represents a snapshot.

FIG. 15A illustrates a management status of a snapshot in a case where some unused capacity is still left in a DVOL1. When data is updated in a PVOL in this management status, the snapshot processing unit 914 saves data, stored in the data blocks in the PVOL to be updated, to the DVOL1. When a snapshot reference request is sent from the client apparatus 2 in the management status of FIG. 15A, the snapshot processing unit 914 creates snapshots VVOL11, VVOL12, and so on, by using the PVOL and the DVOL1.

FIG. 15B illustrates a case where switching from a DVOL1 to a DVOL2 is performed due to lack of unused capacity in the DVOL1 (the unused capacity is equal to or lower than a predetermined threshold value). When data in a PVOL is updated after the switching of DVOLs is performed, the snapshot processing unit 914 acquires an unused LU from the logical volume management unit 915 to thereby secure the DVOL2, and then saves the data, stored in the data blocks of the PVOL to be updated, to the DVOL2. Upon securing the DVOL2, the snapshot processing unit 914 creates (stores) the snapshot management table 923 in the DVOL2 and updates the volume configuration table 922 and the snapshot configuration table 924.

Note that when switching of DVOLs is performed, the snapshot processing unit 914 automatically acquires a snapshot VVOL20 (hereinafter, switch snapshot) of the PVOL at the time of the switching. The snapshot processing unit 914 manages the acquired snapshot VVOL20 by using the snapshot management table 923 of the DVOL2. Specifically, the snapshot processing unit 914 reverses (sets at "1") the most significant bit (left-end bit) of each corresponding CoW bitmap 9237 in the snapshot management table 923 in the DVOL2 and sets a field of the snapshot name 9238 of the snapshot management table as "VVOL20".

FIG. 15C illustrates a case where a snapshot reference request is sent from the client apparatus 2 on condition that a DVOL1 and a DVOL2 have been created. In response to a reference request of a VVOL21 or a VVOL22, the snapshot processing unit 914 creates the VVOL21 or the VVOL22 on the basis of a PVOL and the DVOL2. Further, in response to a reference request of a VVOL11 or a VVOL12, the snapshot processing unit 914 creates a VVOL20 and creates the VVOL11 or the VVOL12 by using the created VVOL20 and the DVOL1.

FIGS. 16A to 16G illustrate the method of switching DVOLs illustrated in FIGS. 15A to 15C but more specifically with reference to the status of the PVOL, the DVOL, and the snapshot management table 923. The method of switching DVOLs are specifically described with reference to FIGS. 16A to 16G. In the description below, both the PVOL and the DVOL have three data blocks, and the number of manageable snapshot generations is four (i.e., the CoW bitmap 9237 includes four bits).

Figure 16A:
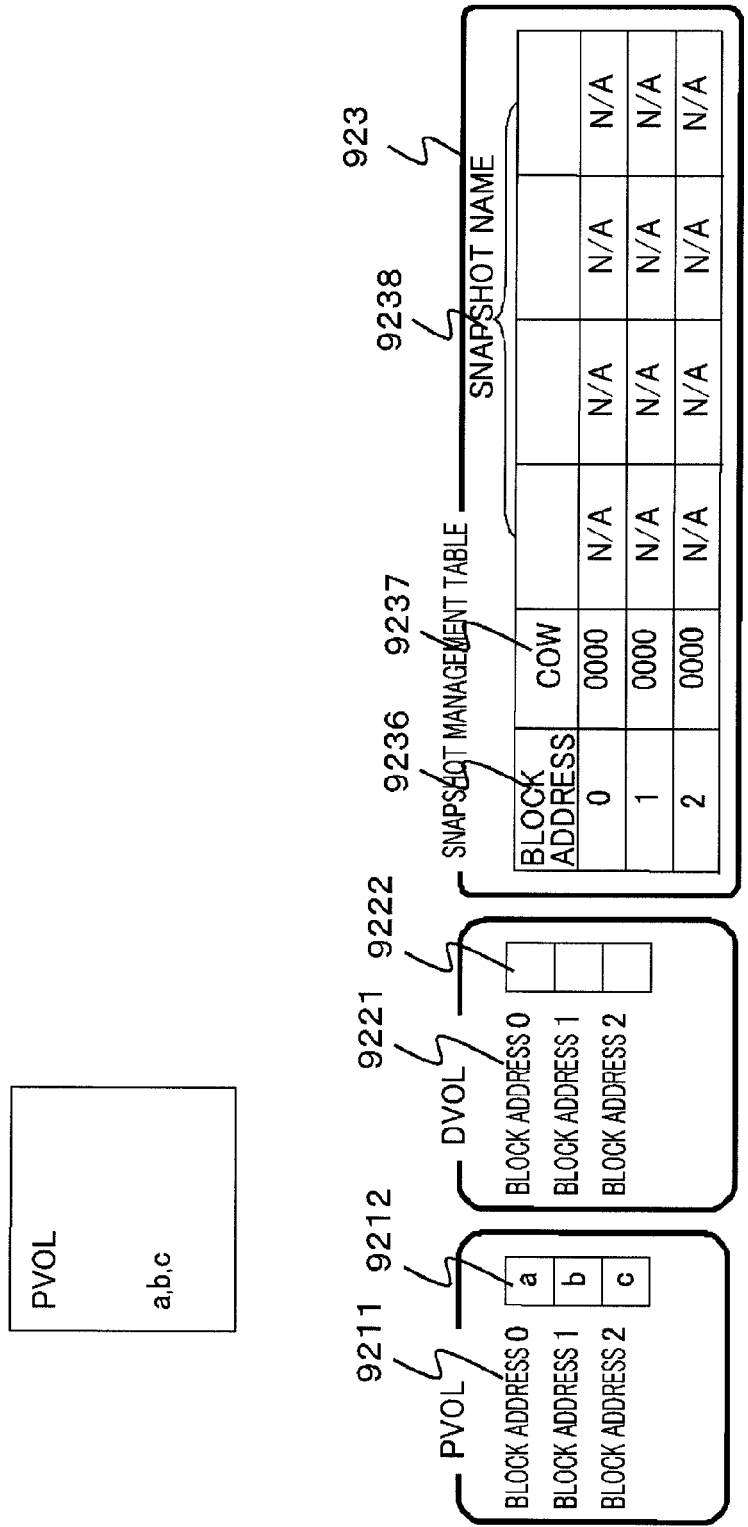
FIG. 16A is a diagram illustrating the method of switching DVOLs more specifically.

FIG. 16A illustrates a status (hereinafter, initial status) of each of the PVOL, the DVOL (DVOL1 in FIG. 16A), and the snapshot management table 923 before updating of the PVOL. As illustrated in FIG. 16A, in the initial status, "a", "b", and "c" are stored in the data blocks 9212 corresponding to the block addresses 0 to 2 in the PVOL, respectively. No snapshot is acquired in the initial status, and therefore no useful data is stored in the DVOL1. Further, all bit values of each CoW bitmap 9237 in the snapshot management table 923 are set at "0", and no value is set in the fields and contents of the snapshot name 9238.

Figure 16B:
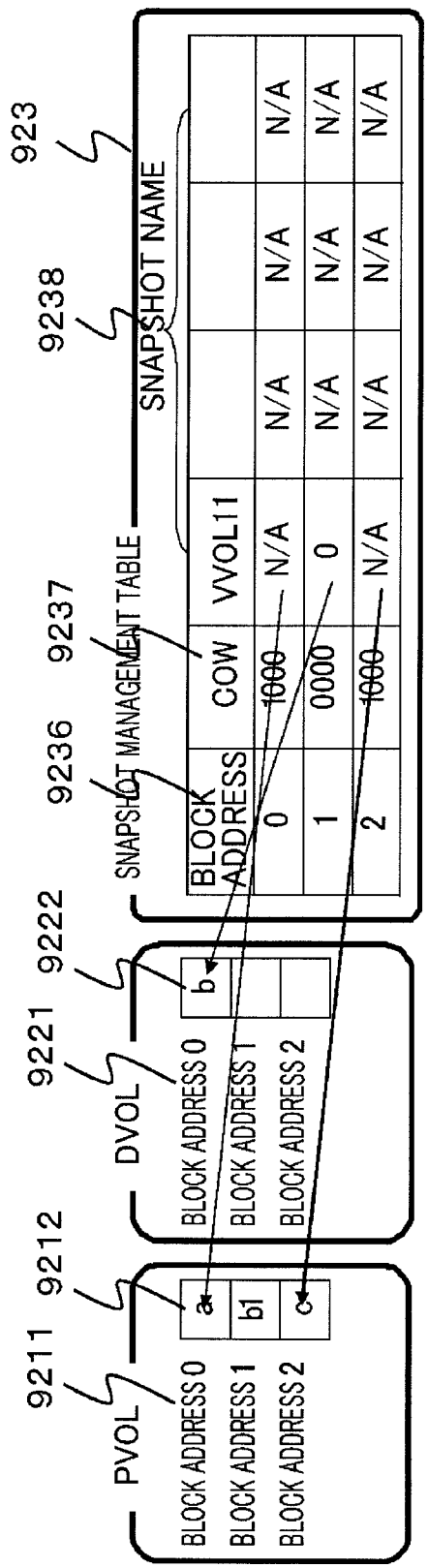
FIG. 16B is a diagram illustrating the method of switching DVOLs more specifically.

FIG. 16B illustrates a status where the content of the data block 9212 corresponding to the block address 1 of the PVOL is updated from "b" to "b1" in the initial status of FIG. 16A. As illustrated in FIG. 16B, the data "b", which has been stored in the data block 9212 of the block address 1 in the PVOL until the updating, is saved to the block address 0 in the DVOL1. Further, the most significant bit (left-end bit) of each of the CoW bitmaps 9237 of the block addresses 0 and 2 in the snapshot management table 923 is reversed (set at "1"). Furthermore, "VVOL11" is set in a field of the snapshot name 9238 of the snapshot management table 923, and "0" is set in the content of the block address 1 of the name. The "0" indicates the block address of the DVOL1 to which the old data "b" is saved.

Figure 16C:
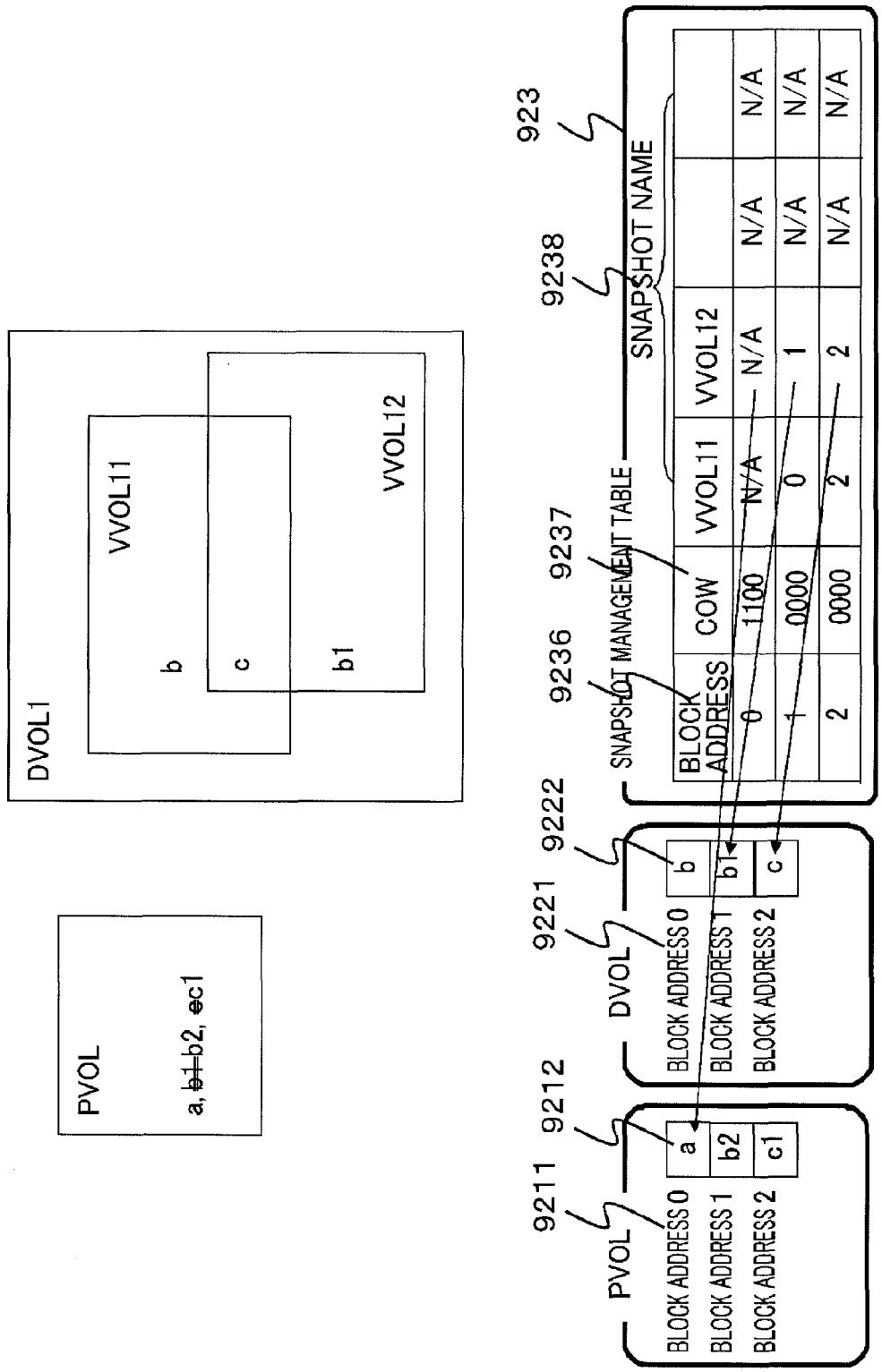
FIG. 16C is a diagram illustrating the method of switching DVOLs more specifically.

FIG. 16C illustrates a status where a snapshot VVOL12 is acquired in the status of FIG. 16B, the content of the data block 9212 of the block address 1 in the PVOL is then updated from "b1" to "b2", and thereafter the content of the data block 9212 of the block address 2 is updated from "c" to "c1". As illustrated in FIG. 16C, the data "b1", which has been stored in the data block 9212 of the block address 1 in the PVOL until the updating, is saved to the block address 1 in the DVOL1. Further, the data "c", which has been stored in the data block 9212 of the block address 2 in the PVOL until the updating, is saved to the block address 2 in the DVOL1.

The most significant bit (left-end bit) and the second bit, from the left end, of the CoW bitmap 9237 of the block address 0 are reversed (set at "1") in the snapshot management table 923. Because the block address 2 in the PVOL is updated, the most significant bit (left-end bit) of the CoW bitmap 9237 of the block address 2 is reversed (reset to "0") in the snapshot management table 923.

In addition, a field of the snapshot name 9238 in the snapshot management table 923 is set as "VVOL12". The content of the block address 1 of the name is set at "1". The "1" indicates the block address in the DVOL1 to which the old data "b1" is saved. The content of the block address 2 of the name is set as "2". The "2" indicates the block address in the DVOL2 to which the old data "c" is saved. Further, the content of the block address 2 belonging to the snapshot name "VVOL11" is set as "2". The "2" indicates the block address in the DVOL1 to which the old data "c" is saved.

Figure 16D:
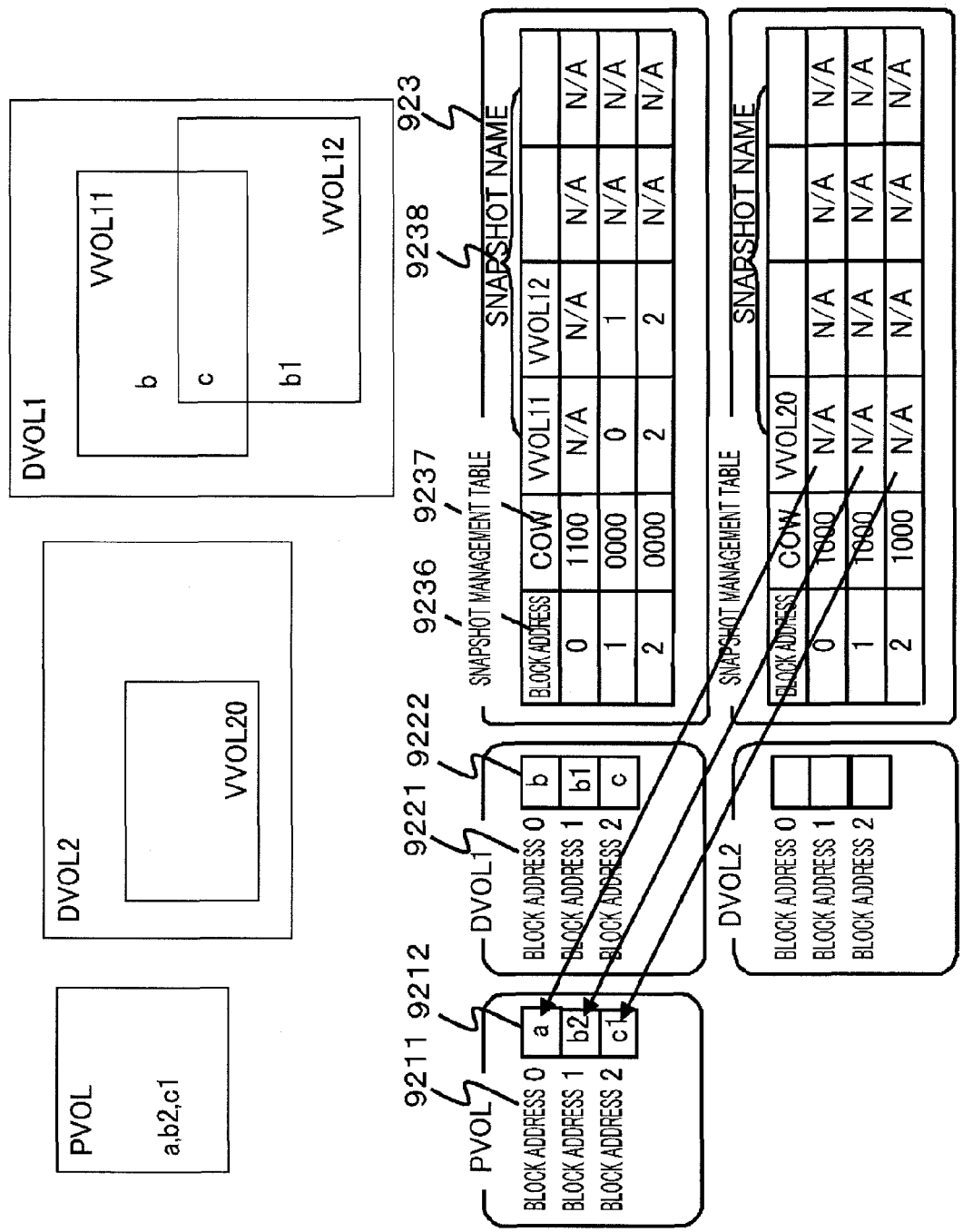
FIG. 16D is a diagram illustrating the method of switching DVOLs more specifically.

FIG. 16D illustrates a case where the capacity of the DVOL1 is lacking in the status of FIG. 16C, and the LU of the saving destination is switched to a DVOL2. As described previously, when the capacity of the DVOL1 is lacking, the snapshot processing unit 914 automatically acquires the snapshot VVOL20 of the PVOL at the time of switching. Then, the snapshot processing unit 914 manages the acquired snapshot VVOL20 by using the snapshot management table 923 of the DVOL2. In the acquisition of the VVOL20, the snapshot processing unit 914 creates the DVOL2 (e.g., secures an unused LU) and creates the snapshot management table 923 of the DVOL2. The snapshot processing unit 914 reverses (sets at "1") the most significant bits (left-end bits) of all CoW bitmaps 9237 in the snapshot management table 923 and sets "VVOL20" in a field of the snapshot name 9238 in the snapshot management table 923 of the DVOL2.

Figure 16E:
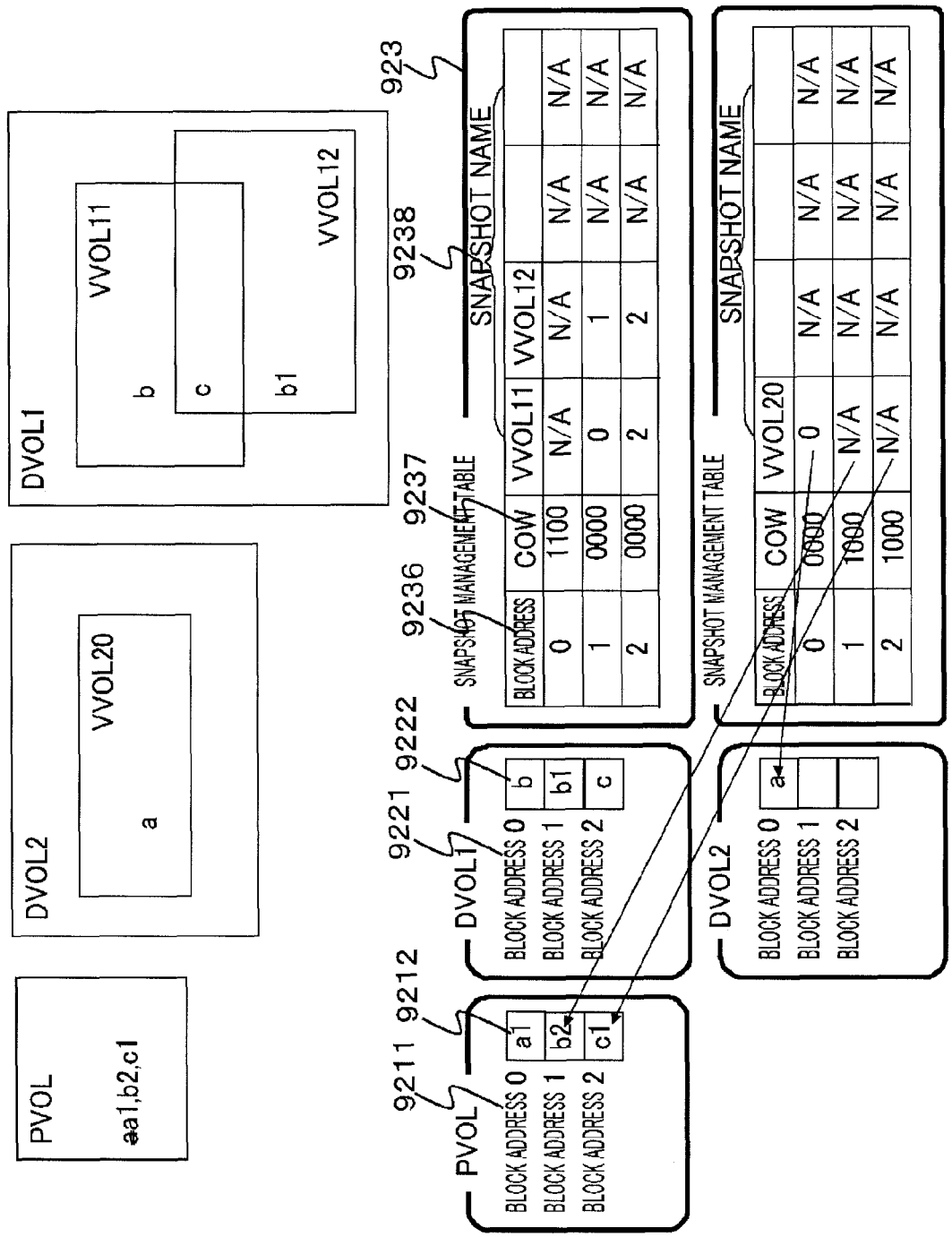
FIG. 16E is a diagram illustrating the method of switching DVOLs more specifically.

FIG. 16E illustrates a status where the content of the data block 9212 of the block address 0 of the PVOL is updated from "a" to "a1" after the switching of the DVOLs in FIG. 16D is performed. As illustrated in FIG. 16E, the data "a", which has been stored in the data block 9212 of the block address 0 in the PVOL until the updating, is saved to the block address 0 in the DVOL2. Because the block address 0 in the PVOL is updated, the most significant bit (left-end bit) of the CoW bitmap 9237 of the block address 0 is reversed (reset to "0") in the snapshot management table 923 in the DVOL2. The content of the block address 0 belonging to the snapshot name 9238 "VVOL20" is set at "0" in the snapshot management table 923 of the DVOL2. The "0" indicates the block address in the DVOL2 to which the old data "a" is saved.

Figure 16F:
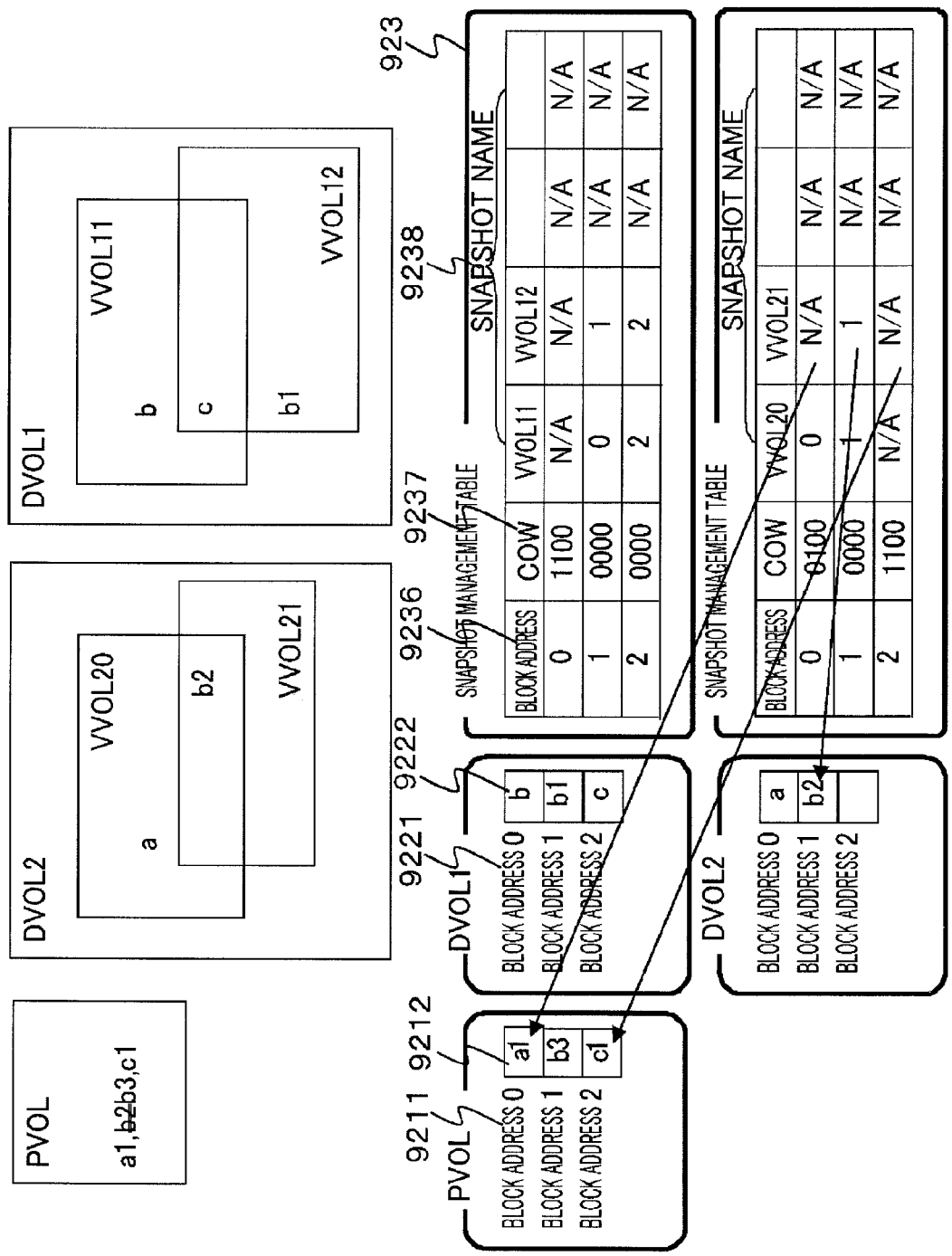
FIG. 16F is a diagram illustrating the method of switching DVOLs more specifically.

FIG. 16F illustrates a status where a snapshot VVOL21 is acquired in the status of FIG. 16E, and then the content of the data block 9212 of the block address 1 in the PVOL is updated from "b2" to "b3". As illustrated in FIG. 16F, the data "b2", which has been stored in the data block 9212 of the block address 1 in the PVOL until the updating, is saved to the block address 1 in the DVOL2. The second bits, from the left end, of the block address 0 and block address 2 are reversed (set at "1") in the snapshot management table 923 in the DVOL2. Because the block address 1 in the PVOL is updated, the most significant bit (left-end bit) of the CoW bitmap 9237 of the block address 1 is reversed (reset to "0") in the snapshot management table 923 in the DVOL2.

In addition, a field of the snapshot name 9238 in the snapshot management table 923 is set as "VVOL21", and the content of the block address 1 of the name is set as "1". The "1" indicates the block address in the DVOL2 to which the old data "b2" is saved. The content of the block address 1 belonging to the snapshot name 9238 "VVOL20" is set as "1". The "1" indicates the block address of the DVOL2 to which the old data "b2" is saved.

Figure 16G:
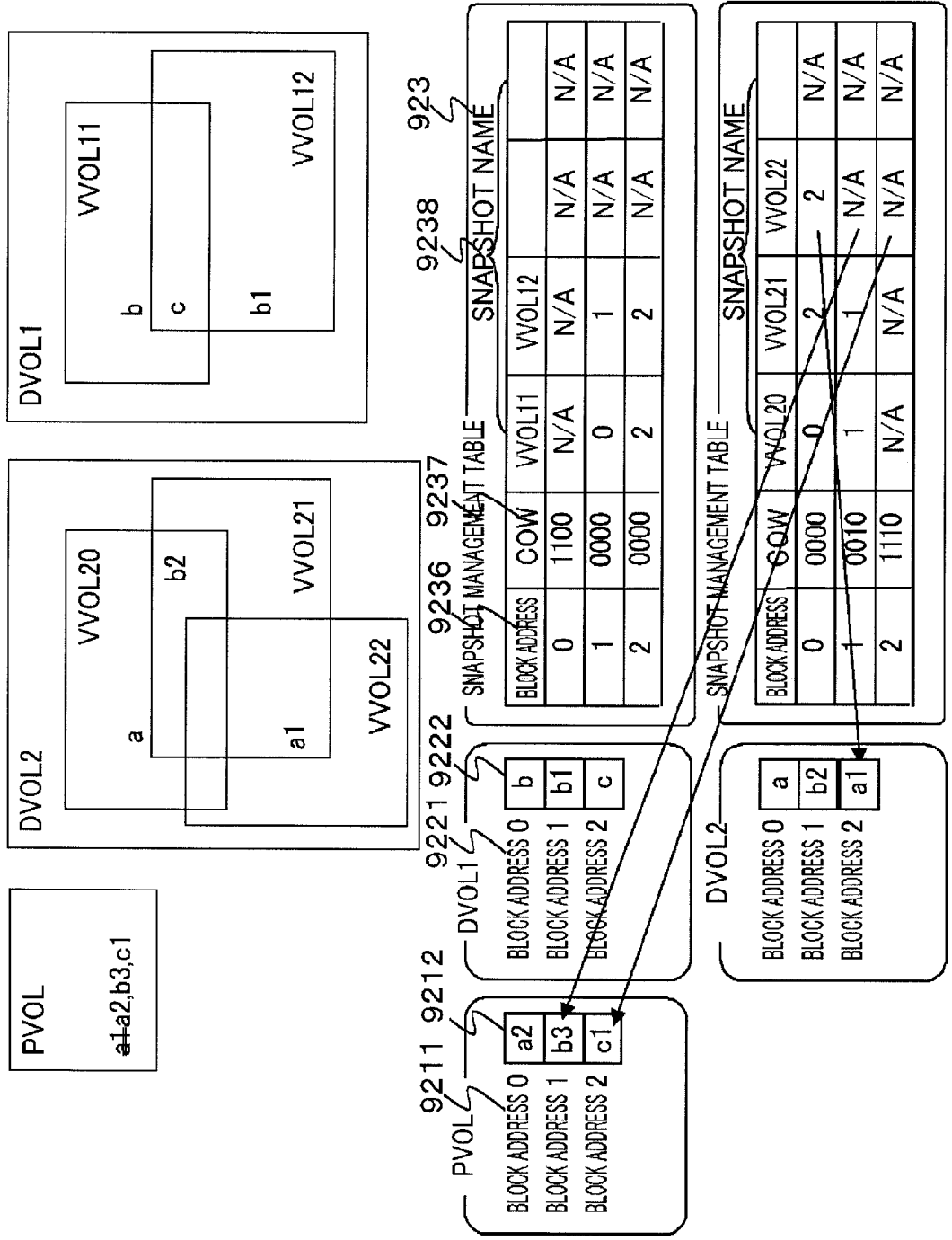
FIG. 16G is a diagram illustrating the method of switching DVOLs more specifically.

FIG. 16G illustrates a status where the content of the data block 9212 of the block address 0 in the PVOL is updated from "a1" to "a2" in the status of FIG. 16F. As illustrated in FIG. 16G, the data "a1", which has been stored in the data block 9212 of the block address 0 in the PVOL until the updating, is saved to the block address 2 in the DVOL2. The second bit, from the left end, of the CoW bitmap 9237 of the block address 0 is reversed (reset to "0") in the snapshot management table 923 in the DVOL2. The third bit, from the left end, of the CoW bitmap 9237 of the block address 1 is reversed (set at "1"). Further, "VVOL22" is set in a field of the snapshot name 9238 in the management table 923 of the DVOL2, and the content of the block address 0 of the name is set at "2". The "2" indicates the block address of the DVOL2 to which the old data "a1" is saved.

The switching of DVOLs is performed in this way using a PVOL, a DVOL, and the snapshot management table 923.

<Creation of Snapshot>

Consider a case where there is a plurality of DVOLs for a single PVOL due to switching of DVOLs, and a reference request of the PVOL is sent. In this case, as illustrated in FIG. 15C, the snapshot processing unit 914 creates (materializes) a snapshot VVOL11 on the basis of the PVOL, the DVOL1, the DVOL2, the snapshot management table 923 in the DVOL1, and the snapshot management table 923 in the DVOL2 and then provides the snapshot VVOL11 to the request source.

Consider a case where a reference request of the snapshot VVOL11 (i.e., in an initial status where "a" is stored in the block address 0, "b" in the block address 1, and "c" in the block address 2 in the PVOL (FIG. 16A)) is sent when the PVOL, the DVOL1, the DVOL2, the snapshot management table 923 in the DVOL1, and the snapshot management table 923 in the DVOL2 are in the status of FIG. 16G. The following describes a method with which the snapshot processing unit 914 creates the snapshot VVOL11 in the initial status in the case above.

Figure 17:
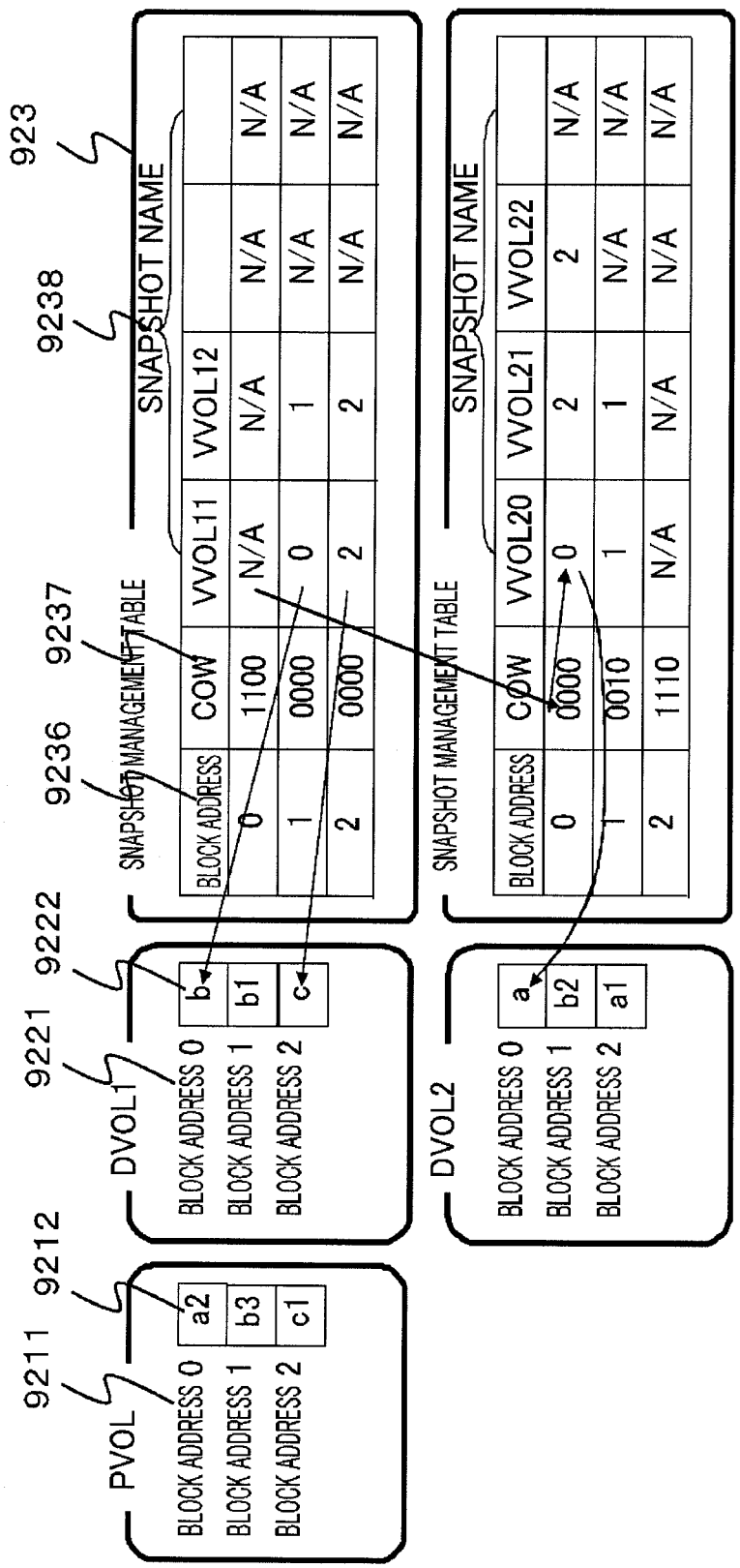
FIG. 17 is a diagram illustrating how a snapshot VVOL11 is created.

FIG. 17 is a diagram illustrating how a snapshot VVOL11 is created. Firstly, the snapshot processing unit 914 refers to the CoW bitmap 9237 of each block address in the snapshot management table 923 in the DVOL1 and the CoW bitmap 9237 of each block address in the snapshot management table 923 in the DVOL2. Then, the snapshot processing unit 914 determines whether each block address 9211 of the PVOL is not updated (CoW) while the DVOL1 is used but is updated (CoW) after the DVOL is switched to the DVOL2.

The snapshot processing unit 914 acquires, based on the DVOL2 and the snapshot management table 923 of the DVOL2, data in the block addresses 9211 that are not updated (CoW) while the DVOL1 is used but are updated after the DVOL is switched to the DVOL2. As for the other block addresses 9211, the snapshot processing unit 914 acquires data in these block addresses on the basis of the DVOL1 and the snapshot management table 923 in the DVOL1. Thus, the snapshot processing unit 914 creates the snapshot VVOL11.

<Migration>

As described previously, the migration processing unit 913 migrates (transfers) data managed in the file storage system 7 to the archive storage system 8. The migration processing unit 913 performs migration as needed for example when the storage area of an LU is lacking in the file storage system 7 (an allocatable capacity of the storage area is equal to or lower than a predetermined threshold value) or when backup needs to be performed.

The migration processing unit 913 performs, as needed, migration of data needed for the reference of snapshots described above (data stored in the PVOL and the DVOL; hereinafter, snapshot data). For example, the migration processing unit 913 monitors the number of DVOLs managed in the file storage system 7 (how many LUs are used as DVOLs). When the number of DVOLs is above a predetermined threshold value, the migration processing unit 913 determines a migration method and migrates the PVOL or the DVOLs to the archive storage system 8 on the basis of the determined migration method.

Figure 18A:
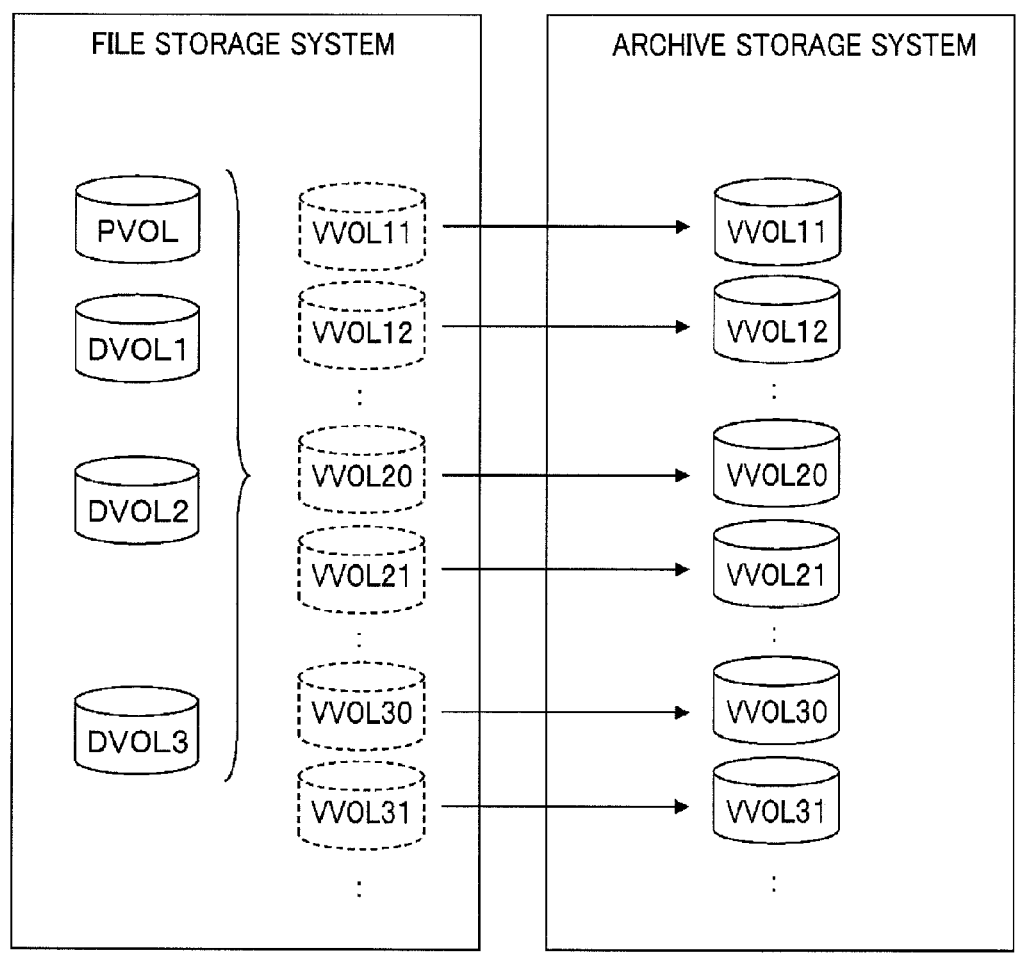
FIG. 18A is a diagram illustrating a first method.
Figure 18B:
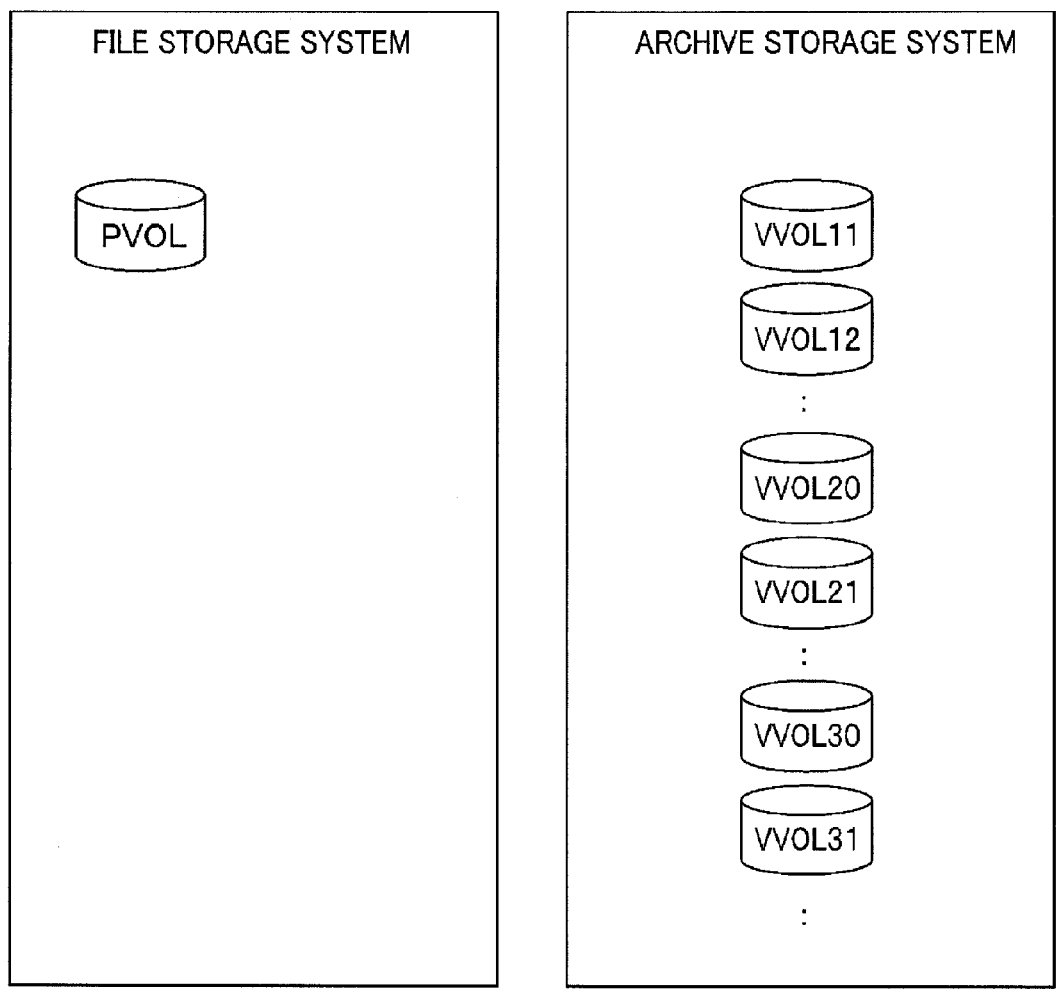
FIG. 18B is a diagram illustrating the first method.

There are three methods, namely, first, second and third methods for the above-mentioned migration method of the snapshot data. With the first method, all the snapshots are materialized and managed in the archive storage system 8 as illustrated for example in FIG. 18A. In the description below, materialized data of a snapshot may be referred to as a snapshot image. In FIG. 18A, a solid line indicates data that is materialized as an LU while a dotted line indicates unmaterialized data (data that can be materialized using the PVOL and the DVOL). With the first method, the archive storage system 8 manages only the snapshot image that is materialized from a snapshot and does not manage the snapshot data. As illustrated in FIG. 18B, the migration processing unit 913 deletes the DVOLs in the file storage system 7 after the migration.

Figure 19A:
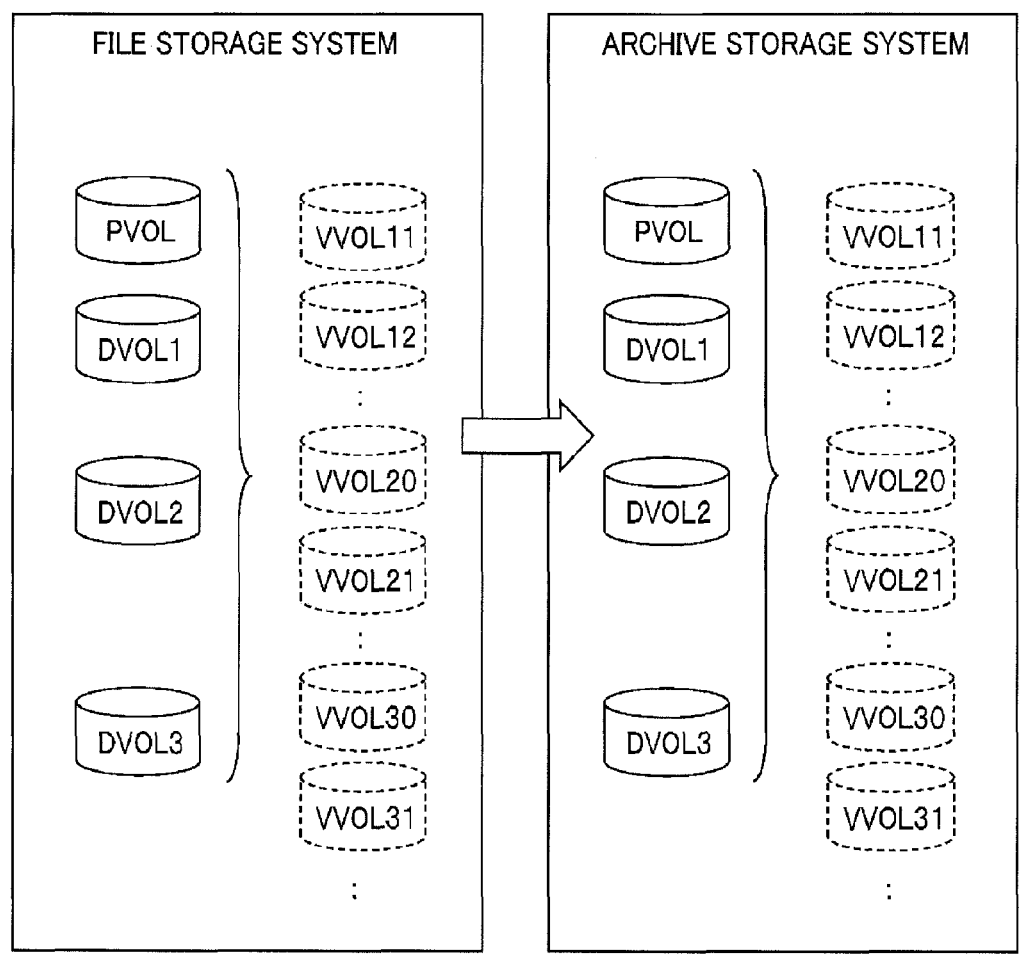
FIG. 19A is a diagram illustrating a second method.
Figure 19B:
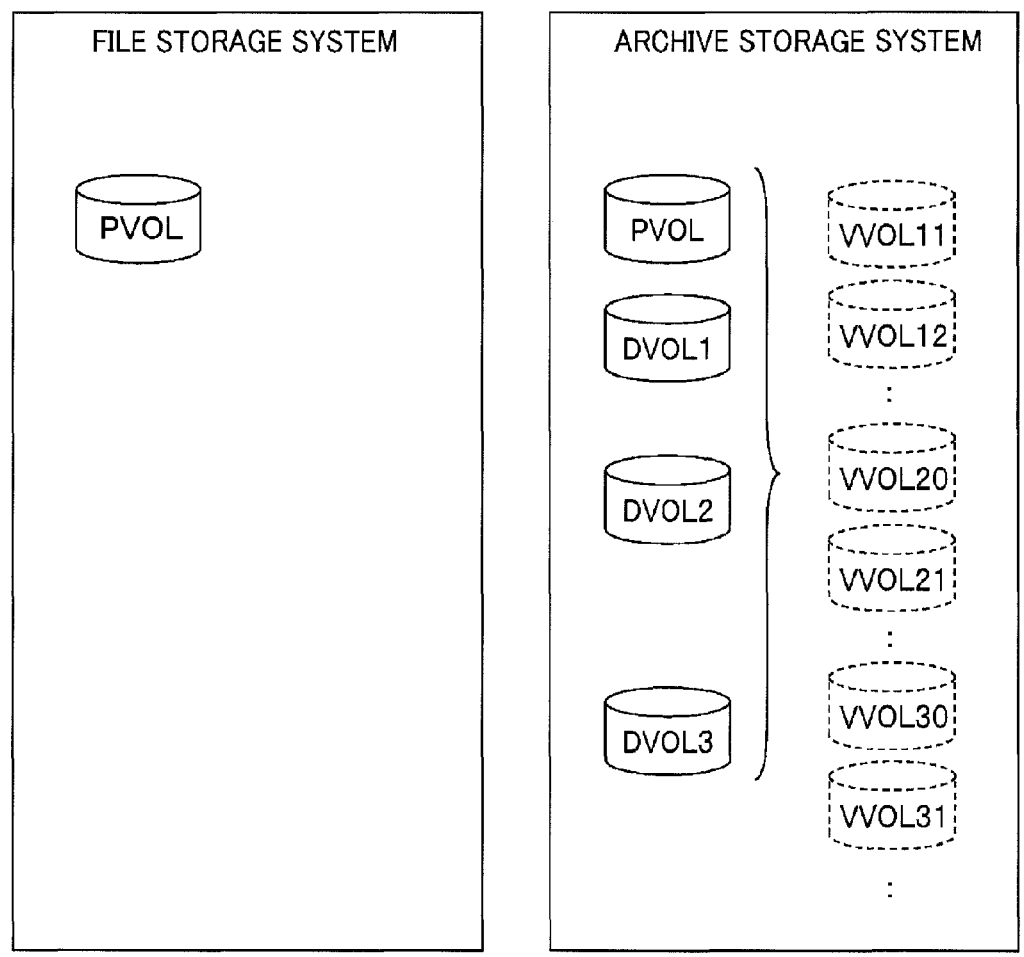
FIG. 19B is a diagram illustrating the second method.

With the second method, the snapshots are not materialized, and the snapshot data is managed as is (using the PVOL and the DVOLs) in the archive storage system 8 as illustrated for example in FIG. 19A. As illustrated in FIG. 19B, the migration processing unit 913 deletes the DVOLs in the file storage system 7 after the migration.

Figure 20A:
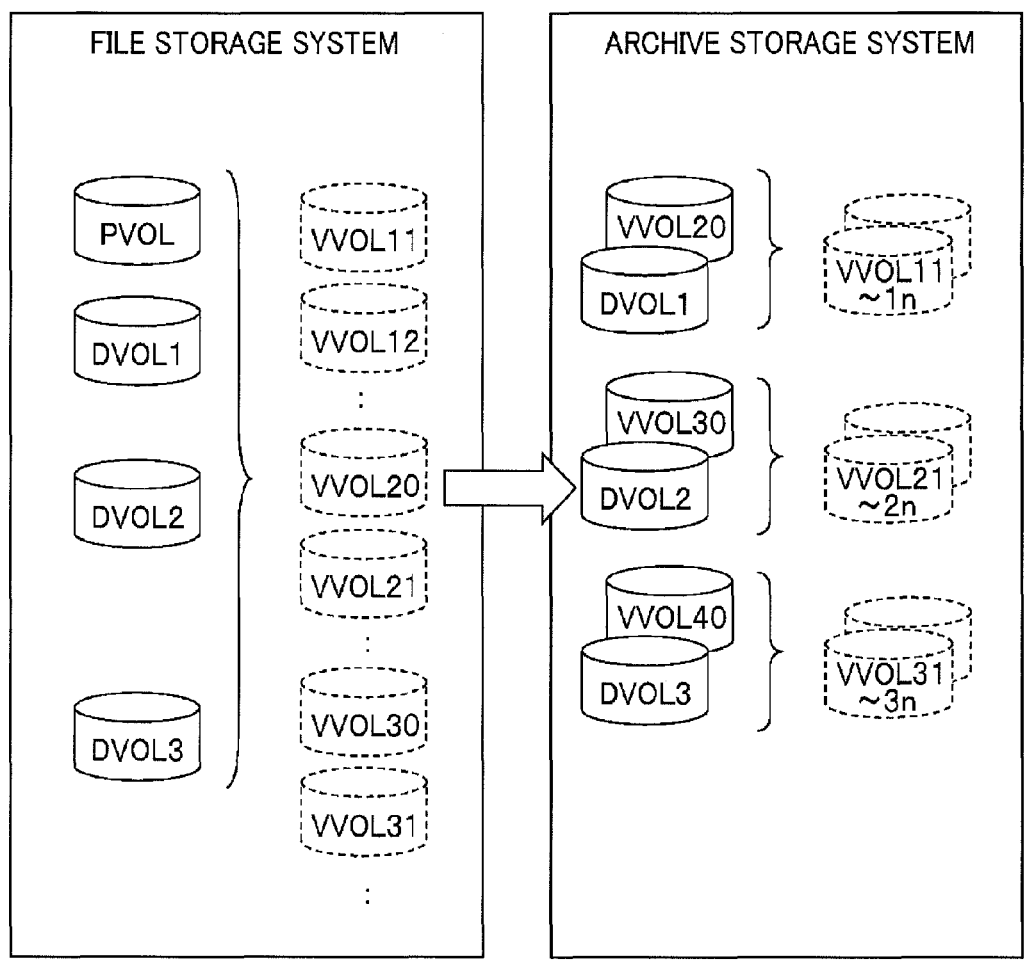
FIG. 20A is a diagram illustrating a third method.
Figure 20B:
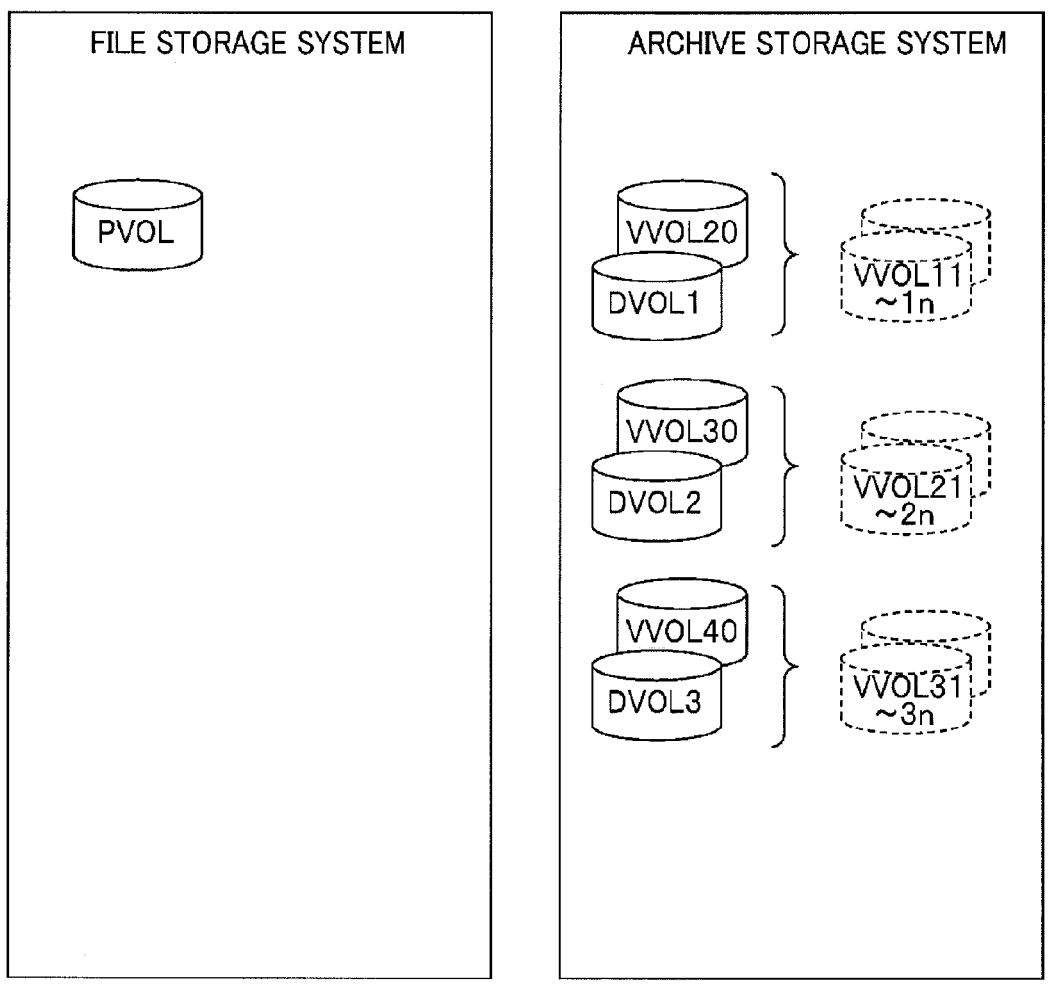
FIG. 20B is a diagram illustrating the third method.

With the third method, only the DVOLs (the DVOL1, the DVOL2 and so on) and switch snapshots (the VVOL20, the VVOL30 and so on) are materialized (i.e., snapshot images thereof are created) and managed in the archive storage system 8 as illustrated for example in FIG. 20A. As illustrated in FIG. 20B, the migration processing unit 913 deletes the DVOLs in the file storage system 7 after the migration.

The migration processing unit 913 determines (selects) the migration method by executing a process illustrated in FIG. 21 (hereinafter, migration method determining process S2100). Then, on the basis of the determined migration method, the migration processing unit 913 migrates the snapshot data from the file storage system 7 to the archive storage system 8. The migration method determining process S2100 is described below with reference to FIG. 21.

Figure 21:
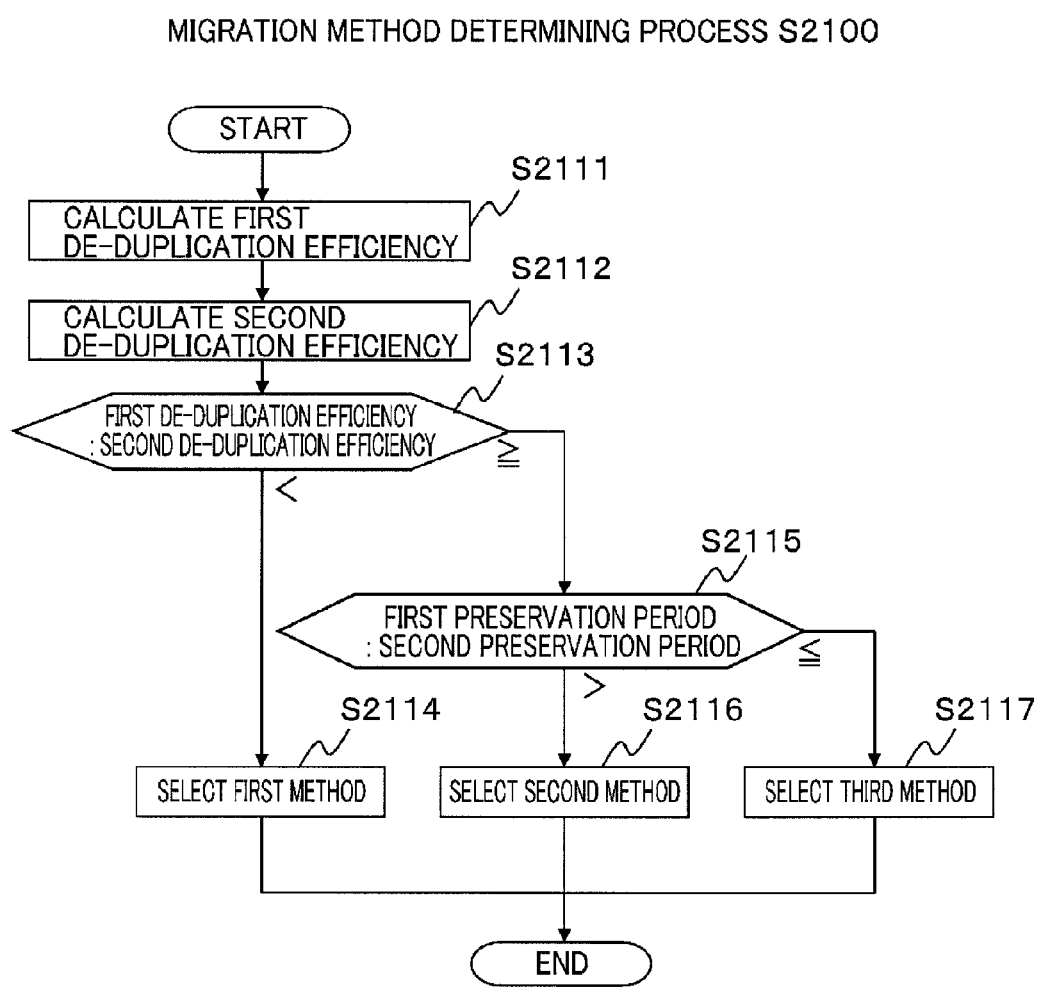
FIG. 21 is a flowchart illustrating a migration method determining process S2100.

As illustrated in FIG. 21, the migration processing unit 913 calculates de-duplication efficiency of snapshot data (PVOL and DVOL data) currently managed in the file storage system 7 (hereinafter, first de-duplication efficiency)(S2111). Furthermore, the migration processing unit 913 also calculates de-duplication efficiency of snapshot images in a case where all the snapshots are materialized on the basis of the snapshot data (i.e., de-duplication efficiency in a case where the first method is performed; hereinafter, second de-duplication efficiency) (S2112).

The first de-duplication efficiency is calculated for example by the following formula.

First de-duplication efficiency=(number of data blocks of *PVOL*+number of data blocks of all *DVOLs*)/(number of data blocks of *PVOL**number of all *VVOLs*)   Formula 1

Further, the second de-duplication efficiency is calculated for example by the following formula.

Second de-duplication efficiency=de-duplication efficiency by de-duplication processing unit 916=(number of used data blocks of all materialized *VVOLs* (snapshot images) after duplication is eliminated by de-duplication processing unit 916)/(number of used data blocks of all materialized *VVOLs* (snapshot images) in a case where de-duplication is not performed by the de-duplication processing unit 916)   Formula 2

The migration processing unit 913 compares the calculated first de-duplication efficiency with the calculated second de-duplication efficiency (S2113). When the first de-duplication efficiency is lower than the second de-duplication efficiency (S2113: <), the migration processing unit 913 determines the first method as the migration method (S2114). Incidentally, when the first de-duplication efficiency is equal to the second de-duplication efficiency, the first method may be determined as the migration method as well.

On the other hand, when the first de-duplication efficiency is equal to or higher than the second de-duplication efficiency (S2113: >=), the migration processing unit 913 compares a preservation period of the snapshot data that is set in the file storage system 7 (e.g., a preservation period that is set previously by a user or the like on the basis of a legal period or the like; hereinafter, first preservation period) with a preservation period of the snapshot data that is set in the archive storage system 8 (e.g., a preservation period that is previously set by a user or the like on the basis of a legal period or the like; hereinafter, second preservation period) (S2115). The first preservation period and the second preservation period are stored in the memory 32 and the storage device 33 of the server apparatus 3 in association with the snapshot data and an LU. The first preservation period and the second preservation period are shared by the first server apparatus 3 and the second server apparatus 3.

When the first preservation period is longer than the second preservation period (S2115: >), the migration processing unit 913 determines the second method as the migration method (S2116). When the first preservation period is equal to or shorter than the second preservation period (S2115: <=), the migration processing unit 913 determines the third method as the migration method (S2117). Incidentally, when the first preservation period is equal to the second preservation period, the second method may be determined as the migration method.

As described above, the migration processing unit 913 compares the first de-duplication efficiency, which is de-duplication efficiency of snapshot data currently managed in the file storage system 7, with the second de-duplication efficiency, which is de-duplication efficiency of snapshot images in a case where all the snapshots are materialized on the basis of the snapshot data. When the first de-duplication efficiency is lower than the second de-duplication efficiency, all the snapshots are materialized and stored by the migration processing unit 913 in the archive storage system 8.

Further, when the first de-duplication efficiency is equal to or higher than the second de-duplication efficiency, the migration processing unit 913 compares the first preservation period, which is a preservation period of snapshot data in the file storage system 7, with the second preservation period, which is a preservation period of snapshot data in the archive storage system 8. When the first preservation period is longer than the second preservation period, the migration processing unit 913 determines the second method as the migration method. When the first preservation period is equal to or shorter than the second preservation period, the third method is determined as the migration method.

Thus, when the de-duplication efficiency of the first method is higher than the de-duplication efficiency of the second method, the migration processing unit 913 selects the first method preferentially and performs migration, whereby only the snapshot images are managed in the archive storage system 8. Accordingly, the snapshot data is managed in the archive storage system 8 with high de-duplication efficiency after the migration.

Meanwhile, in a case where the switching of DVOLs is performed a plurality of times, an error to any DVOL prevents correct creation of snapshots, as described previously. Therefore, all DVOLs, before and after the switching, need to be managed unfailingly. When the number of DVOLs under management is high, an error is more likely to happen and it is more likely that the snapshots are not created correctly due to an error. However, when the de-duplication efficiency of the first method is higher than that of the second method with the information processing system 1 of the present embodiment, the first method is selected, i.e., all snapshots are materialized on the basis of snapshot data and managed as snapshot images without using the DVOLs. In this way, even when an error is likely to happen due to a long preservation period or the like, the risk that snapshots cannot be referred to can be reduced.

Further, when the de-duplication efficiency of the first method is equal to or lower than that of the second method, the migration processing unit 913 compares the preservation period of snapshot data before migration (the first preservation period) with the preservation period of snapshot data after the migration (the second preservation period). When the first preservation period is longer than the second preservation period, the migration is performed while selecting the second method. When the first preservation period is equal to or shorter than the second preservation period, only DVOLs and materialized switch snapshots are managed in the archive storage. Thus, when the first method is not expected to produce as much of the de-duplication effect, the migration processing unit 913 selects the second method or the third method in consideration of the preservation period. In this way, snapshot data can be managed using the most preferable method for the significance or the like of the snapshot data.

When the first preservation period is longer than the second preservation period, the second method, with which the snapshot data is managed as it is (being not materialized), is selected, which prevents an increase in load on the storage apparatus 10 that is involved in a process of materializing the snapshots. Further, it is possible to prevent unnecessary consumption of the storage resource of the second storage apparatus 10 which would otherwise be caused by keeping snapshot data whose preservation period is not long.

In addition, when the first preservation period is equal to or shorter than the second preservation period, the third method, with which only DVOLs and materialized switch snapshots are managed in the archive storage, is selected. In this way, compared with a case where all snapshots are materialized, the load on the storage apparatus 10 involved in the migration can be suppressed. Further, the consumption of the storage resource of the second storage apparatus 10 can be suppressed compared with a case where all snapshots are materialized.

As described previously, the switch snapshot (e.g., the VVOL20 in FIG. 15C) is used for creating snapshots that are acquired before the switching (e.g., the VVOL11 and VVOL12 in FIG. 15C), and only the DVOL and the switch snapshot are materialized (the third method). After an error happens, the snapshots that are acquired before the switching (e.g., the VVOL11 and VVOL12 in FIG. 15C) can be created on condition that the DVOL (e.g., the DVOL1 in FIG. 15C) and the materialized snapshot before the switching are both valid. Further, after an error happens, the snapshots that are acquired after the switching (e.g., the VVOL21 and VVOL22 in FIG. 15C) can be created on condition that the DVOL (e.g., the DVOL2 in FIG. 15C) and the materialized switch snapshot after the switching are both valid.

After the migration, the data related to the snapshots is deleted from the file storage system 7. However, the I/O request sent from the client apparatus 2 to the first server apparatus 3 is forwarded to the second server apparatus 3 by the file share processing unit 911 as described previously. Therefore, the client apparatus 2 can access the snapshots regardless of whether or not the migration is performed.

Figure 22:
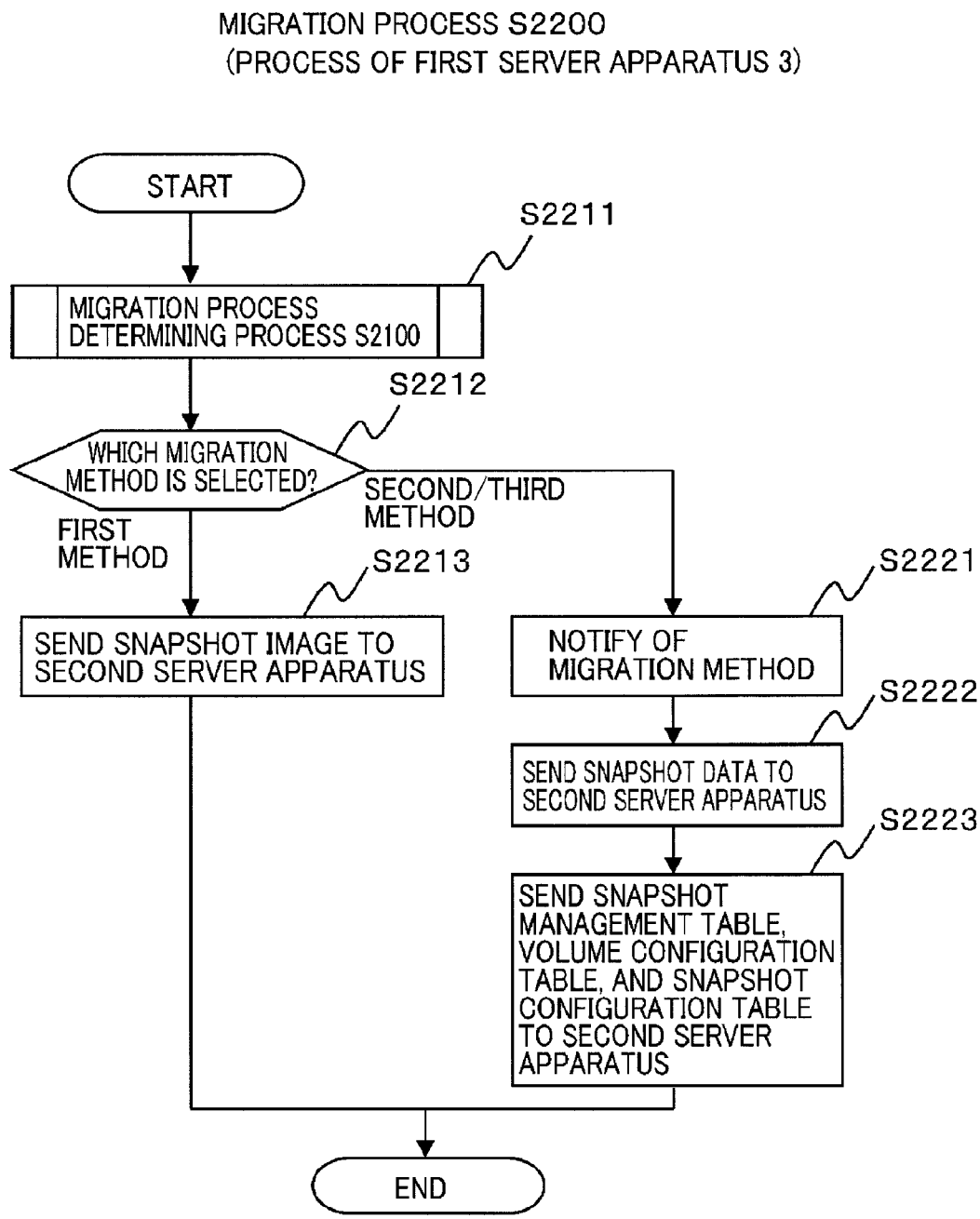
FIG. 22 is a flowchart illustrating a migration process S2200.

FIG. 22 is a flowchart illustrating a specific process (hereinafter, migration process S2200) by which the migration processing unit 913 of the first server apparatus 3 determines the migration method through the migration method determining process S2100 described above, and migrates data managed in the file storage system 7 to the archive storage system 8 on the basis of the determined migration method. The migration process S2200 is described below with reference to FIG. 22.

Firstly, the migration processing unit 913 of the first server apparatus 3 performs the migration method determining process S2100 and determines the migration method (S2211).

Then, the migration processing unit 913 of the first server apparatus 3 determines which migration method has been determined at S2212 (S2212). If the determined migration method is the first method (S2212: First Method), the migration processing unit 913 proceeds to S2214. If it is not the first method (S2212: Second or Third Method), the migration processing unit 913 proceeds to S2221.

At S2113, the migration processing unit 913 of the first server apparatus 3 materializes the snapshot by using the migration-target snapshot data (the PVOL and the DVOL) and then sends the materialized snapshot to the second server apparatus 3.

At S2221, the migration processing unit 913 of the first server apparatus 3 notifies the second server apparatus 3 of information for identifying the migration method determined at S2212. Information for identifying the first preservation period and the second preservation period may be shared by the first server apparatus 3 and the second server apparatus 3 and the second server apparatus 3 may determine whether the second method or the third method is selected.

At S2222, the migration processing unit 913 of the first server apparatus 3 sends the migration-target snapshot data to the second server apparatus 3. Along with the sending, the migration processing unit 913 sends the volume configuration table 922, the snapshot management table 923, and the snapshot configuration table 924 to the second server apparatus 3 (S2223).

FIG. 23A illustrates an exemplary volume configuration table 922. As illustrated in FIG. 23A, the volume configuration table 922 manages therein the configuration of the snapshot data, i.e., the association of an identifier of the PVOL (a PVOL name 9221) with identifiers of all DVOLs created in relation with the PVOL (DVOL names 9222).

FIG. 23B illustrates an exemplary snapshot configuration table 924. As illustrated in FIG. 23B, the snapshot configuration table 924 manages therein the configuration of each snapshot, i.e., the association among an identifier of the snapshot (a snapshot name 9241), an identifier of a PVOL from which the snapshot is created (a PVOL name 9242), an identifier of a DVOL in which differential data of the snapshot is stored (a DVOL name 9243), and a type 9244 of the snapshot ("normal" is set if the snapshot is not a switch snapshot while "switch" is set if the snapshot is a switch snapshot).

Figure 24:
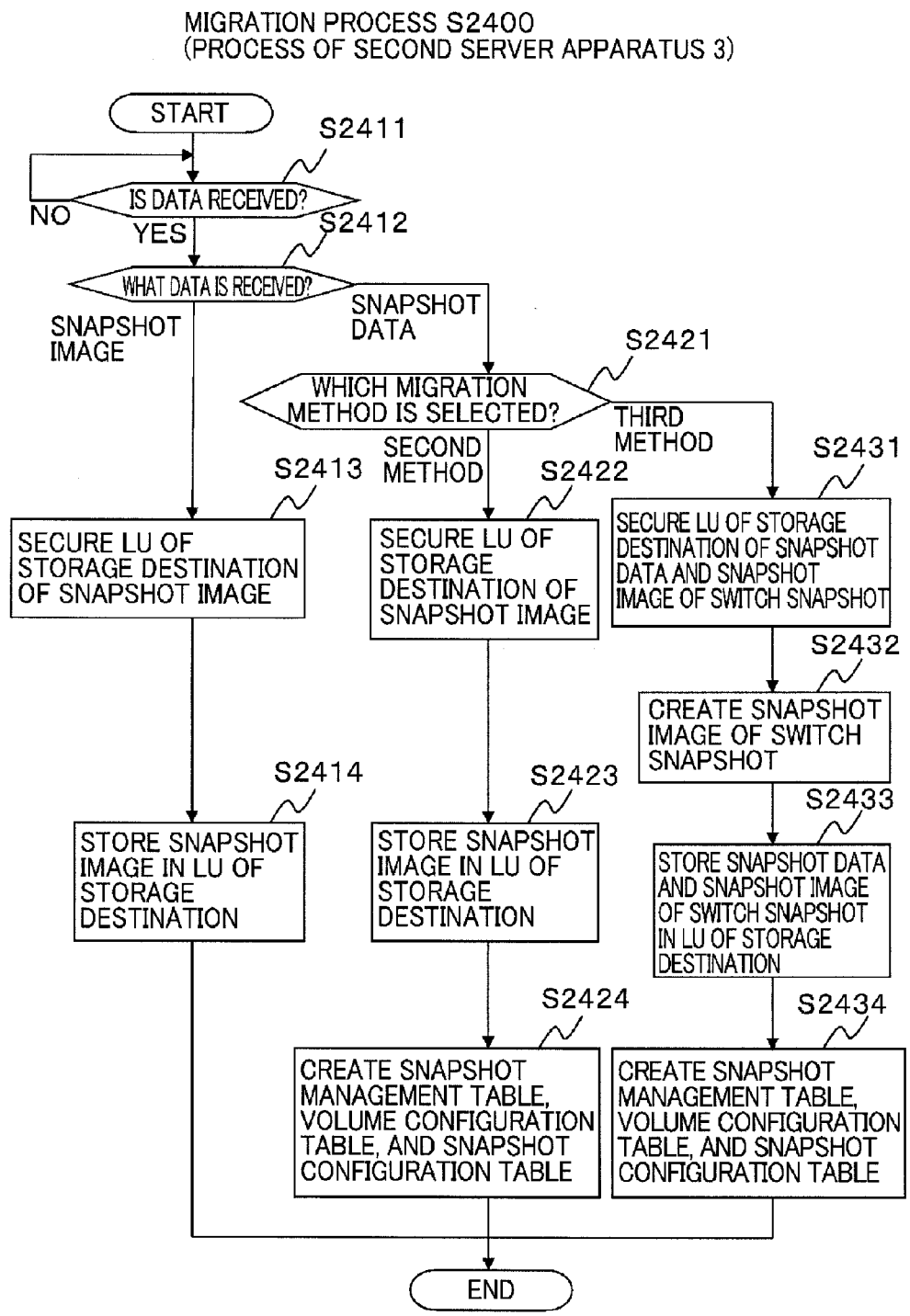
FIG. 24 is a flowchart illustrating a migration process S2400.

FIG. 24 is a flowchart illustrating a process (hereinafter, migration process S2400) that is performed by the migration processing unit 913 of the second server apparatus 3 on the basis of data sent from the first server apparatus 3 through the process illustrated in FIG. 22. The migration process S2400 is described below with reference to FIG. 24.

The migration processing unit 913 of the second server apparatus 3 monitors, as needed, whether or not data is received from the first server apparatus 3 (S2411). When the data is received from the first server apparatus 3 (S2411: YES), the migration processing unit 913 of the second server apparatus 3 determines whether the received data is a snapshot image or snapshot data (S2412).

If the received data is a snapshot image (S2412: Snapshot Image), the migration processing unit 913 of the second server apparatus 3 secures an LU in which the received snapshot image is to be stored (S2413) and stores the received snapshot image in the secured LU (S2414).

In contrast, if the received data is not a snapshot image (S2412: Snapshot Data), the migration processing unit 913 of the second server apparatus 3 determines whether the notified migration method is the second method or the third method (S2421).

If the notified migration method is the second method (S2421: Second Method), the migration processing unit 913 of the second server apparatus 3 secures an LU in which the received snapshot data is to be stored (S2422) and stores the received snapshot data in the secured LU (S2423). On the basis of the volume configuration table 922 the snapshot management table 923, and the snapshot configuration table 924 that are received from the first server apparatus 3, the migration processing unit 913 of the second server apparatus 3 creates a volume configuration table 922, a snapshot management table 923, and a snapshot configuration table 924 that are received from the first server apparatus 3 that are received from the first server apparatus 3 and used for management of the snapshot data in the second server apparatus 3 (S2424).

If the notified migration method is the third method (S2421: Third Method), the migration processing unit 913 of the second server apparatus 3 secures an LU in which the received snapshot data and switch snapshot are to be stored (S2431). Further, the migration processing unit 913 of the second server apparatus 3 creates a snapshot image of the switch snapshot from the snapshot data (S2432).

The migration processing unit 913 of the second server apparatus 3 then stores the snapshot data and the created snapshot image of the switch snapshot in the storage destination LU (S2433). On the basis of the volume configuration table 922, the snapshot management table 923, and the snapshot configuration table 924 that are received from the first server apparatus 3, the migration processing unit 913 of the second server apparatus 3 creates a volume configuration table 922, a snapshot management table 923, and a snapshot configuration table 924 that are received from the first server apparatus 3 and used for management of snapshot data in the second server apparatus 3 (S2434).

<Snapshot>

Figure 25:
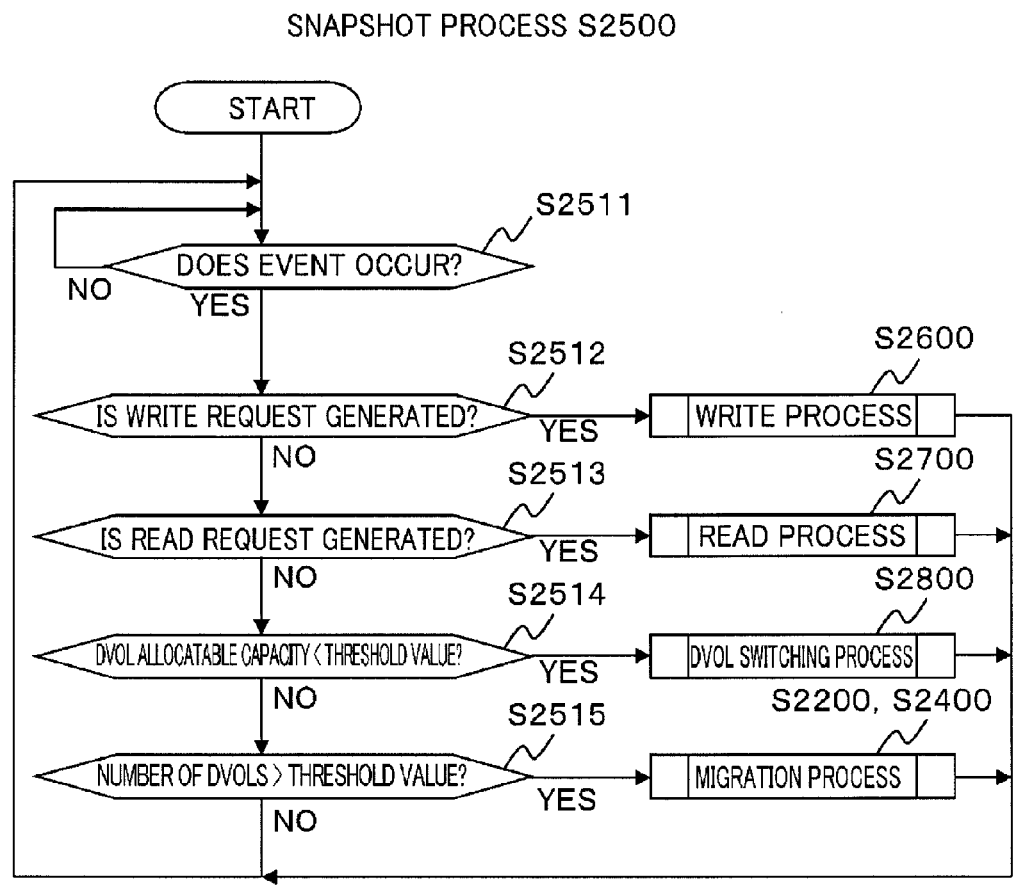
FIG. 25 is a flowchart illustrating a snapshot process S2500.

FIG. 25 is a flowchart illustrating a process (hereinafter, snapshot process S2500) performed by the snapshot processing unit 914 of the first server apparatus 3 (or the second server apparatus 3). The snapshot process S2500 is described below with reference to FIG. 25.

The snapshot processing unit 914 monitors, as needed, an occurrence of an event (S2511). As illustrated in FIG. 25, an event monitored by the snapshot processing unit 914 includes events on whether or not a data write request (write request) into the PVOL is generated (S2512), whether or not a snapshot reference request is generated (S2513), whether or not the allocatable capacity of the DVOL goes below a predetermined threshold value (S2514), and whether or not the number of DVOLs goes above a predetermined threshold value (S2515).

If a data write request (write request) is generated (S2512: YES), a write process S2600 described later is performed. If a snapshot reference request is generated (S2513: YES), a read process S2700 described later is performed. If the allocatable capacity of the DVOL goes below the predetermined threshold value (S2514: YES), a DVOL switching process S2800 described later is performed. If the number of DVOLs goes above the predetermined threshold value (S2515: YES), the migration processes S2200 and S2400 described previously are performed.

In the example illustrated in FIG. 25, whether or not the migration is needed or not is determined on the basis of whether or not the number of DVOLs goes above the threshold value (S2515). Instead, the migration (the migration processes S2200 and S2400) may be performed on the basis of whether or not the allocatable capacity of the storage area in the file storage system 7 goes below a predetermined threshold value, whether or not a period where the migration is needed has arrived, whether or not an execution request of the migration is sent from the client apparatus 2, or the like.

Figure 26:
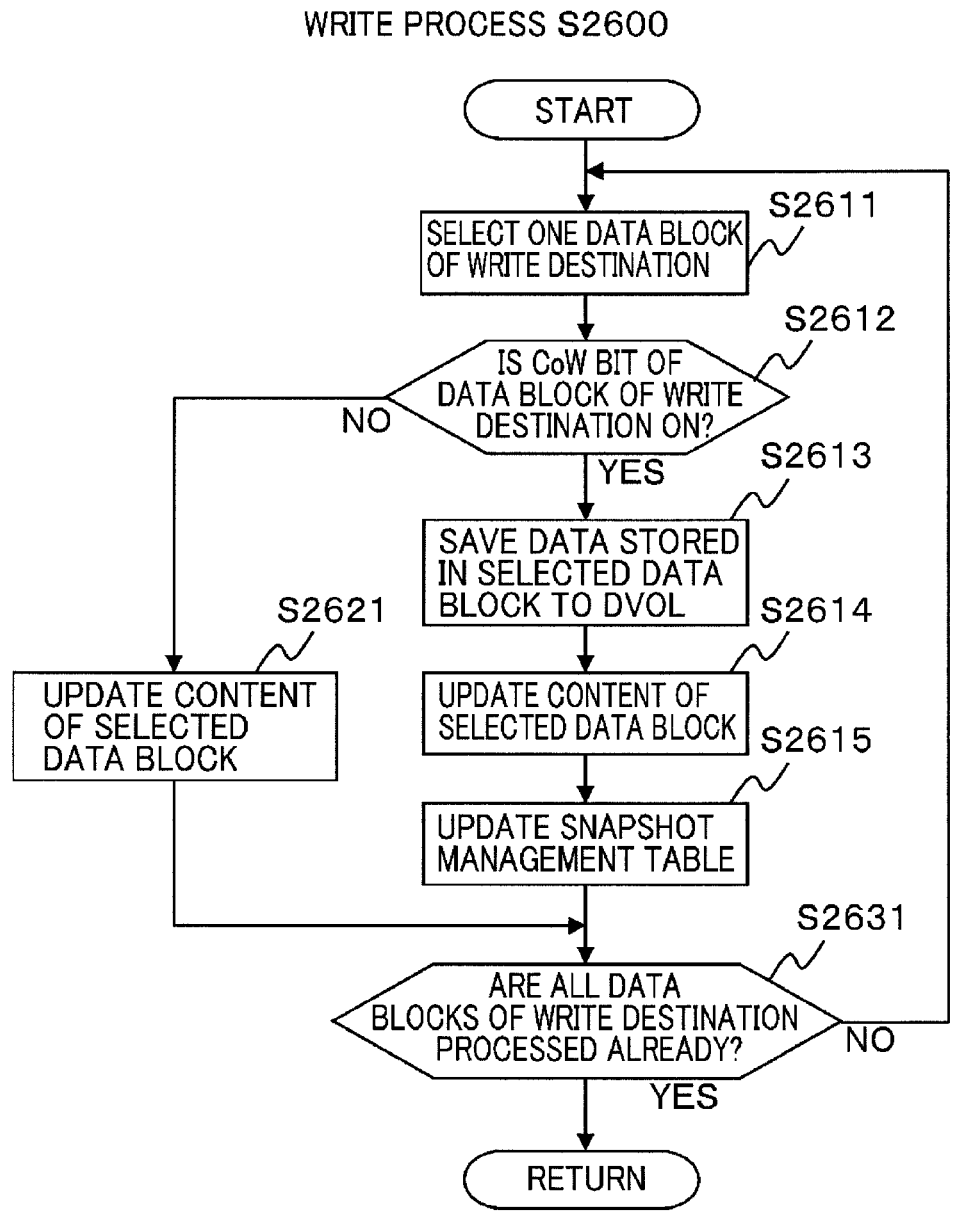
FIG. 26 is a flowchart illustrating a write process S2600.

FIG. 26 is a flowchart illustrating the write process S2600. The snapshot processing unit 914 first selects one of the data blocks that are specified as a write destination in the data write request (S2611). The data blocks of the write destination are specified for example as an LBA (Logical Block Address) in the data I/O request sent from the client apparatus 2.

The snapshot processing unit 914 refers to the CoW bitmap of the selected data block in the snapshot management table 923 and checks whether the bit of the CoW bitmap is on (CoW is needed) or not (S2612).

If the bit of the CoW bitmap of the selected data block is off (S2612: NO), the snapshot processing unit 914 updates (writes write data into the PVOL) the content of the selected data block (S2621) and then proceeds to S2631.

If the bit of the CoW bitmap of the write-destination data block is on (S2612: YES), the snapshot processing unit 914 identifies the DVOL currently being used on the basis of the snapshot configuration table 924 and saves the data stored in the selected data block to the DVOL (S2613).

Then, the snapshot processing unit 914 updates (writes write data into the PVOL) the content of the selected data block (S2614).

The snapshot processing unit 914 then updates the snapshot management table 923 (S2615). Specifically, the block address of the DVOL of the saving destination is written into the block address 9236 in the snapshot management table 923, and the flag of the CoW bitmap 9237 of the updated data block is turned off in the snapshot management table 923.

At the subsequent S2631, the snapshot processing unit 914 determines whether or not all the data blocks that are specified as the write destination in the data write request have been processed. If all the data blocks have been processed (S2631: YES), the snapshot processing unit 914 returns to S2511 in FIG. 25. If all the data blocks have not been processed (S2631: NO), the snapshot processing unit 914 returns to S2611.

Figure 27:
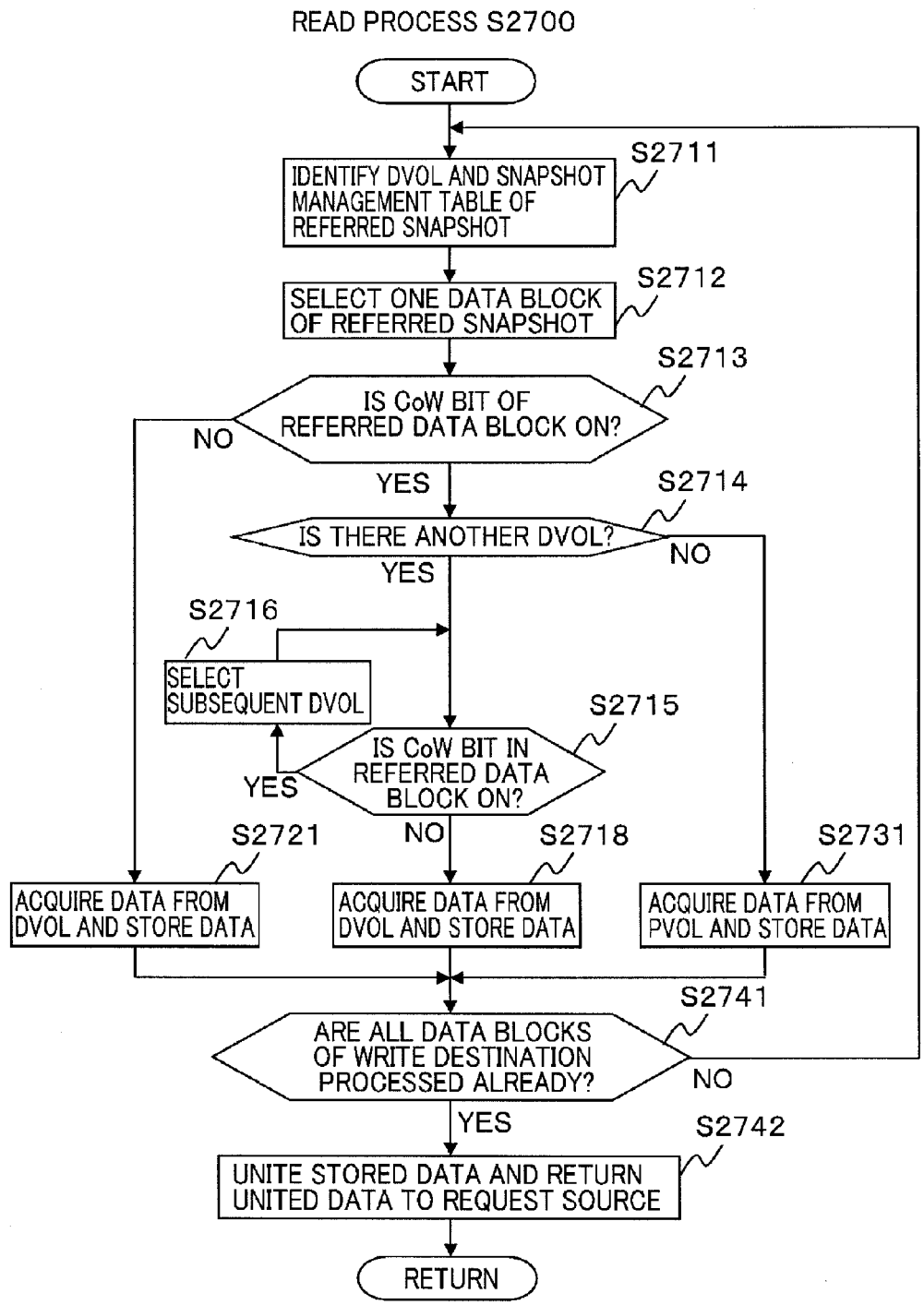
FIG. 27 is a flowchart illustrating a read process S2700.

FIG. 27 is a flowchart illustrating the read process S2700 performed when a snapshot reference request is sent. The snapshot reference request that is sent from the client apparatus 2 specifies an identifier of a snapshot (hereinafter, snapshot name).

The snapshot processing unit 914 compares the snapshot name specified in the snapshot reference request with the configuration table 924 (or the volume configuration table 922) and identifies the first DVOL (the DVOL other than the switched DVOLs) (the DVOL1 in FIG. 23A) and the snapshot management table 923 corresponding to the snapshot name (S2711).

The snapshot processing unit 914 then selects one of the data blocks of the referred snapshot that is specified by the snapshot name (S2712). Thereafter, the snapshot processing unit 914 refers to the CoW bitmap of the selected data block in the snapshot management table 923 and checks whether the bit of the CoW bitmap of the referred data block is on (CoW is needed) or not (S2712).

If the bit of the CoW bitmap of the referred data block is off (S2712: NO), the saved data of the selected data block is acquired from the DVOL and stored (S2721). Then, the snapshot processing unit 914 proceeds to S2741.

On the other hand, if the bit of the CoW bitmap of the referred data block is on (S2712: YES), the snapshot processing unit 914 refers to the volume configuration table 922 and determines whether or not the first DVOL specified at S2711 has been switched to another DVOLs (the DVOL2, DVOL3, DVOL4, or DVOL5 in FIG. 23A) (whether or not there are subsequent DVOLs in the volume configuration table 922) (S2714).

If there is no switched DVOL (S2714: NO), the snapshot processing unit 914 acquires data stored in the referred data block in the PVOL and memorizes the data (S2731). Then, the snapshot processing unit 914 proceeds to S2741.

If there are switched DVOLs (S2714: YES), the snapshot processing unit 914 refers to the snapshot management tables 923 of the other subsequent switched DVOLs in the switched order (refers to the DVOL2 to DVOL5 in this order in case of FIG. 23A) and then determines whether or not the bit of the CoW bitmap of the referred data block is on (S2715, S2716). If the DVOL is found in which the bit of the CoW bitmap of the referred data block therein is on (S2715: YES), the snapshot processing unit 914 acquires the data of the referred data block that is saved to the DVOL and memorizes the data (S2718). Then, the snapshot processing unit 914 proceeds to S2741.

At S2741, the snapshot processing unit 914 determines whether or not all the data blocks of the snapshot name specified in the snapshot reference request have been processed. If all the data blocks have been processed (S2741: YES), the snapshot processing unit 914 unites the memorized data and sends the united data to the request source (the client apparatus 2) (S2742) and then returns to S2511 in FIG. 25. If all the data blocks have not been processed yet (S2741: NO), the snapshot processing unit 914 returns to S2711.

As described above, in the information processing system 1 of this embodiment, the first server apparatus 3 calculates the first de-duplication efficiency, which is de-duplication efficiency of snapshot data, and the second de-duplication efficiency, which is de-duplication efficiency of materialized snapshots that are created on the basis of the snapshot data. Then, the method of migrating the snapshot data to the archive system is selected on the basis of a result obtained by comparing the first de-duplication efficiency with the second de-duplication efficiency. Thus, the migration method suitable for effectively using the storage resource in the archive storage system can be selected appropriately. As a result, the storage resource can be effectively used in the data migration involving a snapshot.

This embodiment is described above merely for facilitating the understanding of the present invention and does not intend to restrict the scope of the present invention. The present invention can be modified or improved without departing from the spirit thereof and includes its equivalents.

The invention claimed is:

1. A method of controlling an information processing system including a first storage system that includes a first server apparatus and a first storage apparatus that is communicatively coupled with the first server apparatus, and
a second storage system that includes a second server apparatus and a second storage apparatus that is communicatively coupled with the second server apparatus,
the first storage system and the second storage system being communicatively coupled with each other, wherein
the first storage apparatus provides a first logical volume to the first server apparatus,
the second storage apparatus provides a second logical volume to the second server apparatus,
the first storage system performs de-duplication of the data stored in the first logical storage by using a common entity as entities of data associated with an identifier that the first server apparatus specifies when accessing the first logical volume,
the second storage system performs de-duplication of data stored in the second logical storage by using a common entity as entities of associated with an identifier that the second server apparatus specifies when accessing the second logical volume,
the first server apparatus acquires a snapshot of a primary volume that is the first logical volume,
the first server apparatus stores snapshot data including the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and second de-duplication efficiency which is de-duplication efficiency of snapshot entities that are created on the basis of the snapshot data, and the first server apparatus selects a method of migrating data related to the snapshot to the second storage system on the basis of a result obtained by comparing the first de-duplication efficiency with the second de-duplication efficiency, wherein the first server apparatus selects a first method as the migration method when the first de-duplication efficiency is lower than the second de-duplication efficiency, the first method being a method including creating a snapshot image that is data materialized from the snapshot, and migrating the created snapshot image to the second storage system, the first server apparatus stores a first preservation period which is set for the snapshot in the first storage system, and a second preservation period which is set for the snapshot in the second storage system, the first server apparatus selects a second method as the migration method when the first de-duplication efficiency is equal to or higher than the second de-duplication efficiency and also when the first preservation period is longer than the second preservation period, the second method being a method including migrating the snapshot data to the second storage system, the first server apparatus stores the first preservation period which is set for the snapshot in the first storage system, and the second preservation period which is set for the snapshot in the second storage system, when an allocatable capacity of the first differential volume reaches a predetermined threshold value or below, the first server apparatus switches a storage destination of the differential data to a second differential volume that is another first logical volume different from the first differential volume, the first server apparatus acquires a switch snapshot that is the snapshot of the primary volume at the time of the switching, the first server apparatus selects a third method as the migration method when the first de-duplication efficiency is equal to or higher than the second de-duplication efficiency and also when the first preservation period is equal to or shorter than the second preservation period, the third method being a method including migrating snapshot images that are data materialized from the first differential volume, the second differential volume, and the switch snapshot to the second storage system, the first storage system manages data in the first logical volume on a data block basis, the first de-duplication efficiency is a value obtained by calculation in which a sum of the number of data blocks of the primary volume and the number of data blocks of all the differential volumes is divided by a product of the number of data blocks of the primary volume and the number of all the acquired snapshots, the second storage system manages data in the second logical volume on a data block basis, the second de-duplication efficiency is a value obtained by calculation in which the number of data blocks used after snapshot images materialized from all the snapshot data are de-duplicated is divided by the number of data blocks used in a case where snapshot images materialized from all the snapshot data are not de-duplicated, the first server apparatus includes a file system in which data stored in the first logical volume is managed on a file basis, the second server apparatus includes a file system in which data stored in the second logical volume is managed on a file basis, the de-duplication in the first storage system is performed on a file basis;

the de-duplication in the second storage system is performed on a file basis, the first storage apparatus stores data in the first logical volume on a data block basis;

the snapshot data includes a snapshot management table for keeping information on whether CoW (Copy on Write) is needed or not for each data block, and upon acquiring the snapshot of the primary volume, the first storage apparatus sets, in the snapshot management table, information indicating that the CoW is needed for the data block, the first storage apparatus and the second storage apparatus each include a channel control unit that performs communication with a client apparatus which sends an I/O request, a drive control unit that writes data into a storage device and reads data from the storage device, a cache memory that stores therein data to be written into the storage device or data read from the storage device, and a processor control unit that performs data transfer between at least any two of the channel control unit, the drive control unit, and the cache memory.

2. A method of controlling an information processing system including a first storage system that includes a first server apparatus and a first storage apparatus that is communicatively coupled with the first server apparatus, and a second storage system that includes a second server apparatus and a second storage apparatus that is communicatively coupled with the second server apparatus, the first storage system and the second storage system being communicatively coupled with each other, wherein the first storage apparatus provides a first logical volume to the first server apparatus, the second storage apparatus provides a second logical volume to the second server apparatus, the first storage system performs de-duplication of the data stored in the first logical storage by using a common entity as entities of data associated with an identifier that the first serve apparatus specifies when accessing the first logical volume, the second storage system performs de-duplication of data stored in the second logical storage by using a common entity as entities of data associated with an identifier that the second server apparatus specifies when accessing the second logical volume, the first server apparatus acquires a snapshot of a primary volume that is the first logical volume, the first server apparatus stores snapshot data includinq the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and second de-duplication efficiency which is de-duplication efficiency of snapshot entities that are created on the basis of the snapshot data, and the first server apparatus selects a method of migrating data related to the snapshot to the second storage system on the basis of a result of a obtained by comparing the first de-duplication efficiency with the second de-duplication efficiency, wherein the first server apparatus stores a first preservation period which is set for the snapshot in the first storage system, and a second preservation period which is set for the snapshot in the second storage system, when an allocatable capacity of the first differential volume reaches a predetermined threshold value or below, the first server apparatus switches a storage destination of the differential data to a second differential volume that is another first logical volume different from the first differential volume, the first server apparatus acquires a switch snapshot that is the snapshot of the primary volume at the time of the switching, and the first server apparatus selects a method as the migration method when the first de-duplication efficiency is equal to or higher than the second de-duplication efficiency and also when the first preservation period is equal to or shorter than the second preservation period, the method being a method including migrating snapshot images that are data materialized from the first differential volume, the second differential volume, and the switch snapshot to the second storage system.

3. A method of controlling an information processing system including a first storage system that includes a first server apparatus and a first storage apparatus that is communicatively coupled with the first server apparatus, and a second storage system that includes a second server apparatus and a second storage apparatus that is communicatively coupled with the second server apparatus, the first storage system and the second storage system being communicatively coupled with each other, wherein the first storage apparatus provides a first logical volume to the server apparatus, the second storage apparatus provides a second logical volume to the second server apparatus, the first storage system performs de-duplication of data stored in the first logical storage by using a common entity as entities of data associated with an identifier that the first server apparatus specifies when accessing the first logical volume, the second storage system performs de-duplication of data stored in the second logical storage by using a common entity as entities of data associated with an identifier that the second server apparatus specifies when accessing the second logical volume, the first server apparatus acquires a snapshot of a primary volume that is the first logical volume, the first server apparatus stores snapshot data including the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and the second de-duplication efficiency which is de-duplication efficiency of snapshot entities that are created on the basis of the snapshot data, and the first server apparatus selects a method of migrating data related to the snapshot to the storage system on the basis of a result obtained by comparing the first de-duplication efficiency with the second de-duplication efficiency, wherein the first storage system manages data in the first logical volume on a data block basis, and the first de-duplication efficiency is a value obtained by calculation in which a sum of the number of data blocks of the primary volume and the number of data blocks of all the differential volumes is divided by a product of the number of data blocks of the primary volume and the number of all the acquired snapshot.

4. A method of controlling an information processing system including a first storage system that includes a first server apparatus and a first storage apparatus that is communicatively coupled with the first server apparatus, and a second storage system that includes a second server apparatus and a second storage apparatus that is communicatively coupled with the second server apparatus, the first storage system and the second storage system being communicatively coupled with each other, wherein the first storage apparatus provides a first logical volume to the first server apparatus, the second storage apparatus provides a second logical volume to the second server apparatus, first storage system performs de-duplication of data stored in the first logical storage by using a common entity as entities of data associated with an identifier that the first server apparatus specifies when accessing the first logical volume, the second storage system performs de-duplication of data stored in the second logical storage by using a common entity as entities of data associated with an identifier that the second server apparatus specifies when accessing the second logical volume, the first server apparatus stores snapshot data including the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and second de-duplication efficiency which is de-duplication efficiency of snapshot entities that are created on the basis of the snapshot data, and the first server apparatus selects a method of migrating data related to the snapshot to the second storage system on the basis of a result obtained by comparing the first de-duplication efficiency with the second de-duplication efficiency, wherein the second storage system manages data in the second logical volume on a data block basis, and the second de-duplication efficiency is a value obtained by calculation in which the number of data blocks used after snapshot images materialized from all the snapshot data are de-duplicated is divided by the number of data blocks used in a case where snapshot images materialized from all the snapshot data are not de-duplicated.

5. The method of controlling an information processing system according to claim 2, wherein the first server apparatus includes a file system in which data stored in the first logical volume is managed on a file basis, the second server apparatus includes a file system in which data stored in the second logical volume is managed on a file basis, the de-duplication in the first storage system is performed on a file basis, and the de-duplication in the second storage system is performed on a file basis.

6. the method of controlling an information processing system according to claim 2, wherein the first storage apparatus stores data in the first logical volume on a data block basis;

the snapshot data includes a snapshot management table for keeping information on whether CoW (Copy on Write) is needed or not for each data block, and upon acquiring the snapshot of the primary volume, the first storage apparatus sets, in the snapshot management table, information indicating that the CoW is needed for the data block.

7. The method of controlling an information processing system according to claim 2, wherein the first storage apparatus and the second storage apparatus each include a channel control unit that performs communication with a client apparatus which sends an I/O request, a drive control unit that writes data into a storage device and reads data from the storage device, a cache memory that stores therein data to be written into the storage device or data read from the storage device, and a processor control unit that performs data transfer between at least any two of the channel control unit, the drive control unit, and the cache memory.

8. An information apparatus that functions as a first server apparatus in an information processing system including a first storage system that includes the first server apparatus and a first storage apparatus that is communicatively coupled with the first server apparatus, and a second storage system that includes a second server apparatus and a second storage apparatus that is communicatively coupled with the second server apparatus, the first storage system and the second storage system being communicatively coupled with each other, the first storage apparatus providing a first volume to the first server apparatus, the second storage apparatus providing a second logical volume to the second server apparatus, the first storage system performing de-duplication of data stored in the first logical storage by using a common entity as entities of data associated with an identifier that the first server apparatus specifies when accessing the first logical volume, the second storage system performing de-duplicaton of data stored in the second logical storage by using a common entity as entities of data associated with an identifier that the second server apparatus specifies when accessing the second logical volume, wherein the first server apparatus acquires a snapshot of a primary volume that is the first logical volume, the first server apparatus stores snapshot data includinq the primary volume and a differential volume that is the first logical volume in which differential data is stored when the primary volume is updated after the acquisition of the snapshot of the primary volume, the differential data being the data having been stored in the primary volume until the updating, the first server apparatus calculates first de-duplication efficiency which is de-duplication efficiency of the snapshot data, and second de-duplication efficiency which is de-duplication efficiency of snapshot entities that are created on the basis of the snapshot data, and the first server apparatus selects a method of migrating data related to the snapshot to the second storage system on the basis of a result obtained by comparing the first de-duplication efficiency with the second de-duplication efficiency, wherein the information apparatus stores a first preservation period which is set for the snapshot in the first storage system, and a second preservation period which is set for the snapshot in the second storage system, when an allocatable capacity of the first differential volume reaches a predetermined threshold value or below, the information apparatus switches a storage destination of the differential data to a second differential volume that is another first logical volume different from the first differential volume, the information apparatus acquires a switch snapshot that is the snapshot of the primary volume at the time of the switching, and the information apparatus selects a first method as the migration method when the first de-duplication efficiency is equal to or higher than the second de-duplication efficiency and also when the first preservation period is equal to or shorter than the second reservation period, the first method being a method including migrating snapshot images that are data materialized from the first differential volume, the second differential volume, and the switch snapshot to the second storage system.

9. The information apparatus that functions as the first server apparatus according to claim 8, wherein the information apparatus stores a first preservation period which is set for the snapshot in the first storage system, and a second preservation period which is set for the snapshot in the second storage system, and the information apparatus selects a second method as the migration method when the first de-duplication efficiency is equal to or higher than the second de-duplication efficiency and also when the first preservation period is longer than the second preservation period, the second method being a method including migrating the snapshot data to the second storage system.

10. The information apparatus that functions as the first server apparatus according to claim 8, wherein the information apparatus selects a second method as the migration method when the first de-duplication efficiency is lower than the second de-duplication efficiency, the second method being a method including creating a snapshot image that is data materialized from the snapshot and migrating the created snapshot image to the second storage system.

* * * * *